(12) United States Patent
Kashiyama et al.

(10) Patent No.: US 6,295,415 B1
(45) Date of Patent: *Sep. 25, 2001

(54) CAMERA

(75) Inventors: Ritsuo Kashiyama, Kanagawken; Toshifumi Ohsawa, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/654,535

(22) Filed: May 29, 1996

(30) Foreign Application Priority Data

| Jun. 1, 1995 | (JP) | ................................. 7-156703 |
| Jun. 1, 1995 | (JP) | ................................. 7-156707 |
| Jun. 1, 1995 | (JP) | ................................. 7-156708 |
| Jan. 31, 1996 | (JP) | ................................. 8-035826 |

(51) Int. Cl.⁷ ............................ G03B 7/00; G03B 17/24
(52) U.S. Cl. .................... 396/222; 396/224; 396/281; 396/311; 396/319; 355/40
(58) Field of Search ................ 396/311, 315, 396/319, 320, 222, 224, 225, 281; 355/40

(56) References Cited

U.S. PATENT DOCUMENTS

| 4,811,042 | | 3/1989 | Cloutier et al. | 354/410 |
| 4,908,651 | * | 3/1990 | Fujino et al. | 396/224 |
| 5,027,140 | | 6/1991 | Cloutier | 354/76 |
| 5,229,810 | * | 7/1993 | Cloutier | 396/319 X |
| 5,253,009 | | 10/1993 | Satou et al. | 354/412 |
| 5,396,310 | | 3/1995 | Fujiyama | 354/400 |
| 5,543,872 | * | 8/1996 | Goto et al. | 396/319 |
| 5,579,067 | * | 11/1996 | Wakabayashi | 396/311 |
| 6,038,011 | * | 3/2000 | Ikenoue et al. | 355/40 |

\* cited by examiner

*Primary Examiner*—Alan A. Mathews
(74) *Attorney, Agent, or Firm*—Robin, Blecker & Daley

(57) ABSTRACT

A camera having a magnetic recording circuit for recording information in a magnetic recording part of a film at each of photographing frames of the film is arranged such that, in an automatic exposure bracketing mode or an AE lock mode, information indicating that printing be performed under the same condition is recorded at each of the frames photographed in the above-stated mode.

2 Claims, 26 Drawing Sheets

CAMERA

BACKGROUND OF THE INVENTION

1. Field of the Invention

This invention relates to a camera capable of magnetic recording and having a magnetic recording means for magnetically recording information into a magnetic recording part provided on a film.

2. Description of the Related Art

As one of known automatic exposure control methods for cameras, there is a so-called automatic exposure bracketing method in which exposures for a plurality of frames are made on a film with the exposure value being automatically shifted up and down from the correct exposure. According to this method, photographs of under-exposure or over-exposure can be intentionally obtained automatically in addition to a photograph of correct-exposure.

Further, as a means for use in the automatic exposure control of a camera, there is known an operation switch called "AE lock switch", which is arranged to hold a light value measured by the camera at a value obtained when the operation switch is operated by a camera operator. When the AE lock switch is operated, the camera performs automatic exposure control by deciding an exposure value on the basis of the luminance value of a photographed object obtained when the AE lock switch is operated, irrespective of the current luminance value of the photographed object.

However, in a case where a negative film is used for photographing and is sent to a photofinishing laboratory to have pictures printed, exposure control is performed at a film printing machine in such a way as to make the exposure value correct for each of frames of the film. Therefore, even if the exposure value is automatically shifted up and down from the correct exposure when taking a plurality of photographs in the automatic exposure bracketing mode, the actual printing service results in a plurality of photographs of one and the same exposure. Then, it becomes impossible to have pictures, or photographs, printed at the different rates of exposure as desired by the camera operator.

Similarly, even when photographs are taken with the AE lock switch operated, the exposure control performed at the film printing machine also causes the photographs to be of correct-exposure, which is not intended by the camera operator.

In a case where photographs, or shots, are taken with light-measuring and distance-measuring switches left in their on-states, like in a continuous shooting, it is preferable that the printing process is performed under one and the same condition. In such a case, the exposure control on the printing process also eventually causes the photographs to be of correct-exposure, which differs from an exposure intended by the camera operator.

Meanwhile, a camera disclosed in U.S. Pat. No. 5,027,140 is arranged to record, on a magnetic recording part provided on a film, information indicating that a printing process be performed under one and the same exposure condition so as to reproduce the exposure state taken at the time of photographing, i.e., information indicative of a so-called series scene. In this case, when printing is performed from the film, a plurality of frames at which that information has been recorded are printed under one and the same condition, so that photographs as intended by the camera operator can be obtained.

In the prior art example cited above, however, a signal or information indicative of a series scene is recorded only when a continuous shooting is performed. When the continuous shooting is not performed, the series scene indication signal is not recorded. Therefore, where any scene desired to be printed under the same condition is photographed, the camera operator has no choice but to perform the continuous shooting.

In the meantime, a camera disclosed in Japanese Patent Publication No. SHO 58-53327 is arranged to detect whether a light source used for photographing is a natural light (sunlight), a fluorescent light or a tungsten light and to record the result of detection on a film. In addition, there is also disclosed a method for obtaining adequate prints from a film exposed by such a camera and developed, by carrying out a color balance correcting process during printing. In cases where shots are taken under a fluorescent light illumination using a daylight-type film, prints obtained from the film tend to become greenish. In such a case, the color balance correcting process gives adequate prints by carrying out a printing process realizing that the pictures on the film have been taken under a fluorescent light condition. In addition, as a means for detecting the kind of a light source, there are also disclosed a method for detecting the color of illumination light and a method for detecting flickers included in the illumination light.

Further, a method of using an RGB sensor as a means for detecting the light source used for photographing is disclosed in Japanese Laid-Open Patent Application No. HEI 3-136026, and a method of detecting bright-lines included in a fluorescent light illumination is disclosed in Japanese Laid-Open Patent Application No. HEI 3-163538.

According to the prior art methods cited above, the kind of a light source used for illuminating an object to be photographed is detected before each photographing frame of the film is exposed to light. Therefore, in case where a plurality of frames are to be continuously photographed in succession by automatically shifting the exposure value from a correct exposure value, like in the case of automatic exposure bracketing (hereinafter referred to as "AEB"), a light source detecting action is unnecessarily carried out by the process of detecting the kind of a light source before each frame is exposed, even when it is preferable to keep conditions other than the exposure value constant. As a result, the speed of continuous shooting would be lowered, because an unnecessarily long period of time is required in taking pictures in the mode of continuous shooting. There is another problem that an error in detecting the kind of a light source would cause information indicative of different kinds of light sources to be recorded on a film, for example, even when pictures are taken under the same condition.

Similarly, in a case where photographing is continuously performed while performing an automatic exposure lock (hereinafter referred to as AE lock), photographs are taken with the exposure value intentionally fixed by the camera operator. Therefore, if the kind of a light source is detected before each exposure, a wrong kind of light source might be decided depending on the object or the composition of pictures, despite the AE lock being performed. Then, prints obtained by printing the photographs taken in this manner tend to deviate from what is expected from the AE lock.

SUMMARY OF THE INVENTION

In accordance with one aspect of the invention, there is provided a camera having a magnetic recording circuit arranged to record information in a magnetic recording part provided on a film and having a plurality of photographing modes, the camera comprising a recording control circuit for, when photographing is performed in a particular photographing mode, such as an automatic exposure bracketing mode or an AE lock mode, among the plurality of photographing modes, causing the magnetic recording circuit to record, in the magnetic recording part, information indicating that printing be performed under the same condition with respect to successive frames exposed in the particular photographing mode, so that printing can be performed automatically under the same condition.

In accordance with one aspect of the invention, there is provided a camera having a magnetic recording circuit arranged to record information in a magnetic recording part provided on a film and having a plurality of photographing modes, the camera comprising a recording control circuit for, when photographing is performed in a particular photographing mode, such as an automatic exposure bracketing mode or an AE lock mode, among the plurality of photographing modes, causing the magnetic recording circuit to record in the magnetic recording part information indicating that printing be performed under a condition based on the same light source information with respect to successive frames exposed in the particular mode, so that printing can be performed automatically under the condition based on the same light source information.

In accordance with one aspect of the invention, there is provided a camera having a magnetic recording circuit arranged to record information in a magnetic recording part provided on a film and having a plurality of photographing modes, the camera comprising a recording control circuit for, in a predetermined recording mode, causing the magnetic recording circuit to record in the magnetic recording part information indicating that printing be performed under the same condition with respect to successive frames exposed, a changing circuit for changing one of the plurality of photographing modes over to another, and a canceling circuit for canceling the predetermined recording mode in response to the changing circuit, or an indication circuit for indicating that the predetermined recording mode is inappropriate in response to the changing circuit.

In accordance with one aspect of the invention, there is provided a camera having a magnetic recording circuit arranged to record information in a magnetic recording part provided on a film and arranged to, in a predetermined instruction mode, cause the magnetic recording circuit to record in the magnetic recording part information indicating that printing be performed under the same condition with respect to successive frames exposed, wherein when an operating state or an acting state of the camera becomes a predetermined state, such as loading or unloading of the film, turning-off of a power supply, ending of the film or reaching of the last frame of the film, or when the camera is in a mode in which an instruction for printing all frames of the film under the same condition is given beforehand, the predetermined instruction mode is canceled, or an indication is effected that it is preferable to cancel the predetermined instruction mode, or the predetermined instruction mode is inhibited from being set, so that printing can be prevented from being performed unnecessarily under the same condition due to the predetermined instruction mode.

The above and other aspects and features of the invention will become apparent from the following detailed description of embodiments thereof taken in connection with the accompanying drawings.

DETAILED DESCRIPTION OF THE PREFERRED EMBODIMENTS

The invention is described in detail below through embodiments thereof with reference to the drawings.

(First Embodiment)

Figure 1:
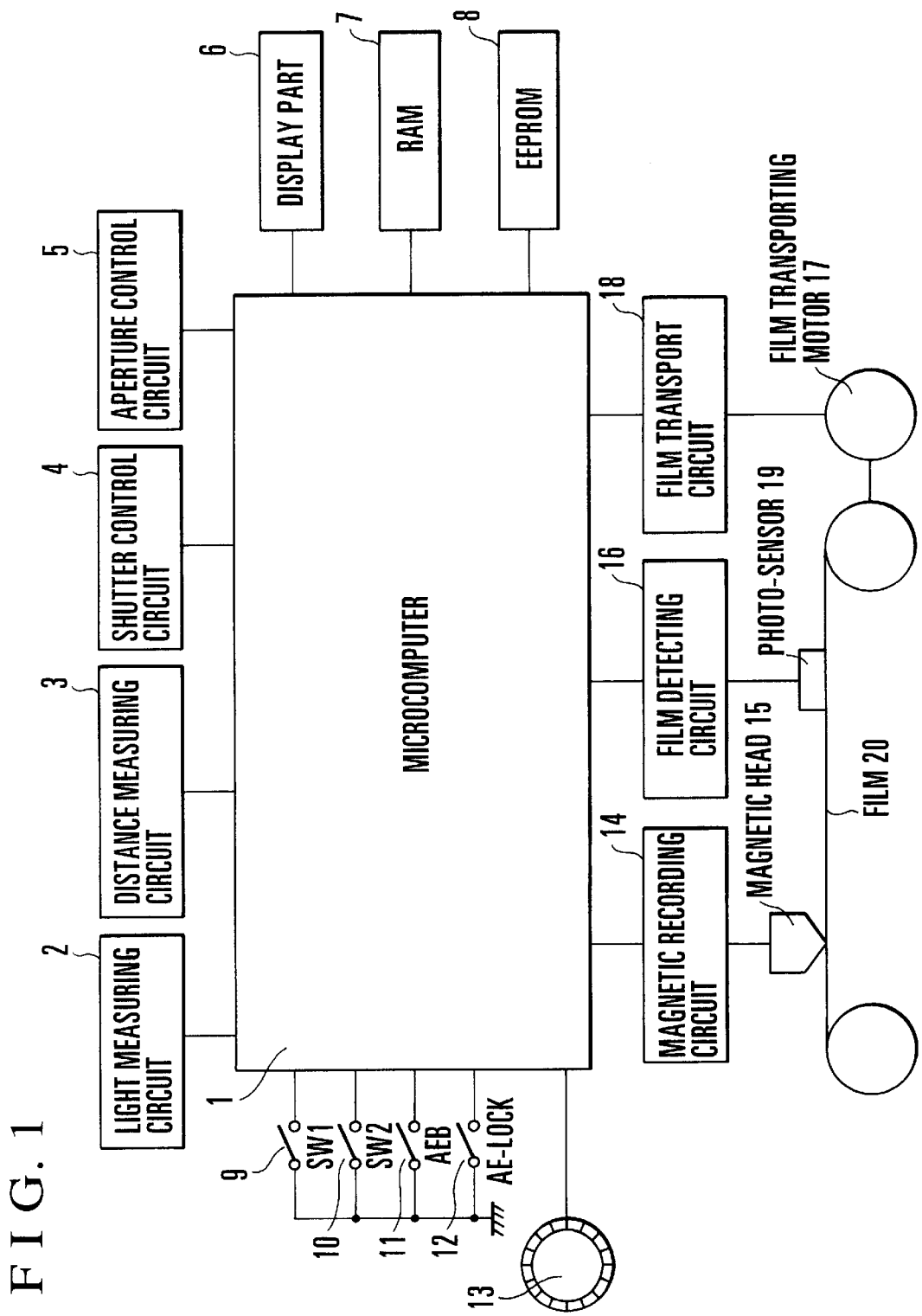
FIG. 1 is a block diagram showing the arrangement of circuits of a camera which is capable of performing magnetic recording and is arranged according to the invention as a first embodiment thereof.

FIG. 1 is a block diagram showing the arrangement of circuits of a camera using a film having a magnetic recording part and arranged as a first embodiment of the invention. Arrangement of each part of the camera is first described as follows.

Referring to FIG. 1, a microcomputer 1 is a control device arranged to control the whole camera. A light measuring circuit 2 is arranged to obtain measured light information to be used in deciding the amount of an exposure. A distance measuring circuit 3 is arranged to find a focus position for moving a photo-taking lens to the focus position. A shutter control circuit 4 is arranged to control the operation of a shutter. An aperture control circuit 5 is arranged to control the stopping-down amount of an aperture provided in the lens. A display part 6 is arranged to display information of varied kinds including a shutter speed, an aperture value, etc., and is disposed either outside of the camera body or within a viewfinder. In a case where the camera is set in a series scene mode, the display part 6 provides a display indicative of the series scene mode.

The term "series scene" as used herein means a series of photographing scenes for which it is desired to print successively-photographed frames under the same condition so as to reproduce the exposure state obtained at the time of photographing, i.e., for which a film printing machine is inhibited from performing the exposure compensation during printing. For this purpose, information indicative of a series scene is recorded in the magnetic recording part provided at each of the applicable photographed frames on the film. In printing from the film, a plurality of applicable frames having the record of that information are printed under the same condition, so that photographs as desired by the camera operator can be obtained. This arrangement have been disclosed in detail in U.S. Pat. No. 5,027,140, etc.

A RAM 7 is an external storage means. An EEPROM 8 is an external nonvolatile storage means. A light-and-distance measuring switch 9 (hereinafter referred to as a switch SW1) is provided for initiation of a light measuring action and a distance measuring (focus detecting) action. A release switch 10 (hereinafter referred to as a switch SW2) is provided for initiation of a shutter release action. An AEB setting switch 11 is provided for setting a mode of automatic exposure bracketing (hereinafter referred to as AEB). An AE lock switch 12 (hereinafter referred to as a switch AE-LOCK) is arranged to decide an exposure value on the basis of a measured light value obtained when the switch AE-LOCK is pushed. A setting dial 13 is arranged to enable the camera operator to set an automatic exposure shifting amount in the AEB mode by turning the dial 13 while turning on the AEB setting switch 11. A magnetic recording circuit 14 is arranged to control a magnetic head 15 for writing photographing information into a magnetic recording part of a film 20. A film detecting circuit 16 is arranged to detect a transporting speed of the film 20 and a position of the film 20 from a signal produced by a photo-sensor 19. A film transport circuit 18 is arranged to control a film transporting motor 17 for transporting the film 20. The film 20 is provided with the magnetic recording part.

Figure 2:
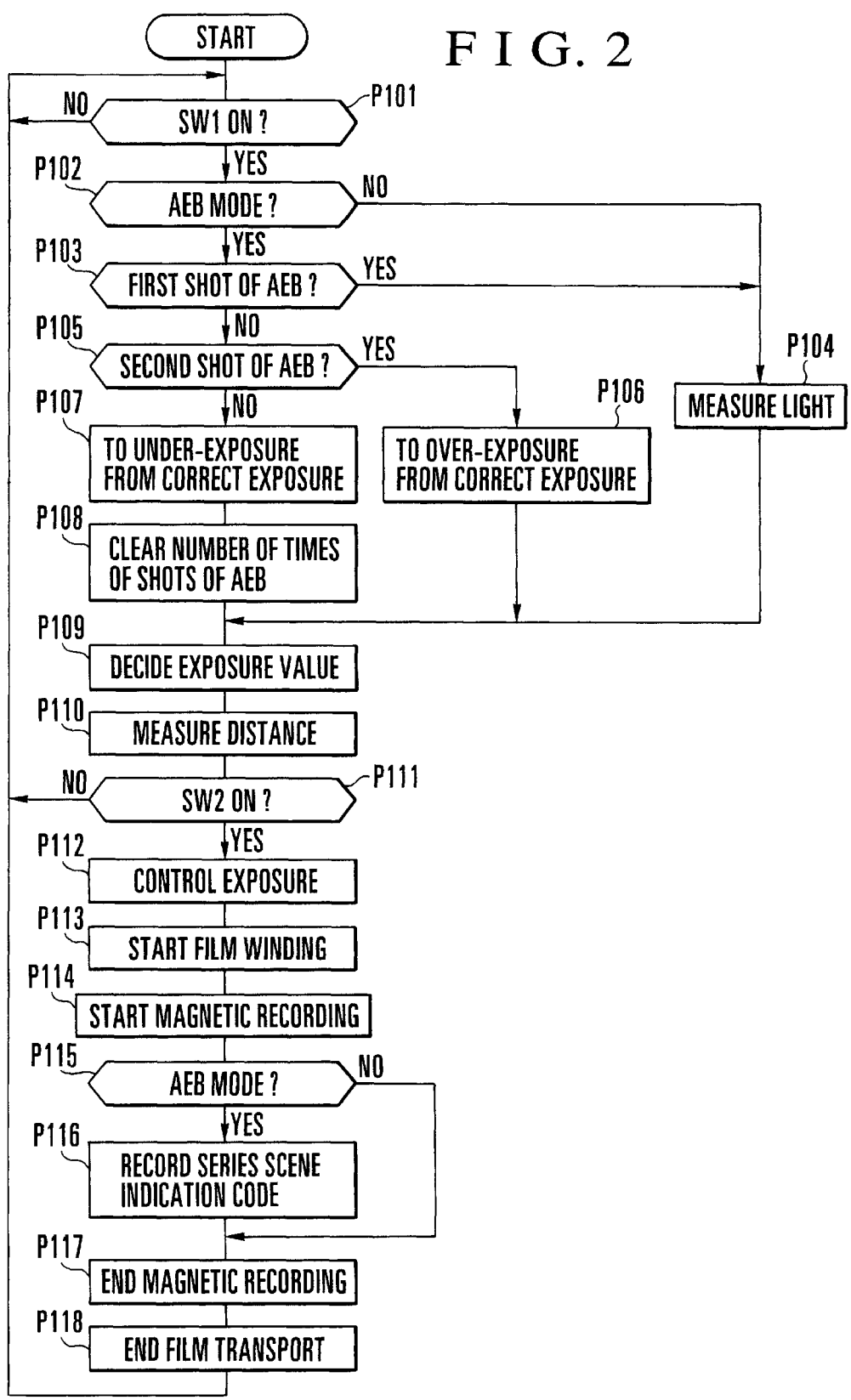
FIG. 2 is a flow chart showing an operation to be performed by the camera capable of magnetic recording in the first embodiment of the invention.

FIG. 2 is a flow chart showing a flow of operation of the microcomputer 1 shown in FIG. 1. The actions of the whole camera are described with reference to the flow chart of FIG. 2 as follows.

In the AEB mode of the camera to be described below, the camera is arranged to take three pictures while shifting the exposure value in the order of correct-exposure, over-exposure and under-exposure in accordance with the exposure shifting amount as set.

When a main switch which is not shown is turned on, the microcomputer 1 comes to operate beginning with a step P101. At the step P101, a check is made to find if the switch SW1 is turned on. If so, the flow proceeds to a step P102 for the commencement of the light and distance measuring actions. If not, the flow waits at the step P101 until the switch SW1 is turned on. At the step P102, a check is made to find if the camera is set in the AEB mode. If so, the flow comes to a step P103. If not, the flow comes to a step S104. A method for setting the AEB mode will be described later herein. At the step P103, a check is made to find if photographing in the AEB mode is for the first shot. If so, the flow comes to the step P104 to decide a correct exposure value. If not, the flow comes to a step P105.

At the step P104, since either the camera is not in the AEB mode or photographing is being performed for the first shot in the AEB mode, the light measuring circuit 2 is caused to measure the quantity of light of an object to be photographed for deciding a correct exposure value. The flow then comes to a step P109.

At the step P105, a check is made to find if photographing in the AEB mode is for the second shot. If so, the flow comes to a step P106. At the step P106, since the photographing operation in the AEB mode is for the second shot, an exposure value is set at such a value that exceeds by a setting amount the correct value which has been set according to a light value measured for the first shot of the AEB mode, for the purpose of causing the second shot in the AEB mode to be taken at an over-exposure value. The flow then comes to the step P109.

If photographing in the AEB mode is found not for the second shot at the step P105, the flow comes to a step P107. At the step P107, since photographing in the AEB mode is for the third shot, an exposure value is set for an under-exposure by setting it at such a value that is less by a setting amount than the correct exposure value set for the first shot. The flow then comes to a step P108. At the step P108, since the third shot of photographing in the AEB mode has been performed, the number of times set for photographing in the AEB mode is cleared to ensure that a next photographing operation in the AEB mode becomes the first shot when photographing is performed in the AEB mode next time. The flow then comes to the step P109.

At the step P109, an exposure value is decided by deciding a shutter speed and an aperture value on the basis of the result of light measurement obtained at the step P104 and the exposure shifting amount set at the step P106 or P107. At a step P110, a distance measuring action is performed by the distance measuring circuit 3. The lens (not shown) is focused on the object by moving the lens. The flow then comes to a step P111.

At the step P111, a check is made to find if the switch SW2 is in an on-state. If not, the flow comes back to the step P101 to repeat the actions described above. If so, the flow comes to a step P112. At the step P112, the aperture control circuit 5 is caused to stop down the aperture of the lens to a position of the aperture value decided at the step P109. Then, an exposure action is performed by causing the shutter control circuit 4 to control and operate a shutter (not shown) at the shutter speed decided at the step P109. The exposure action is terminated by causing the aperture control circuit 5 to bring the aperture back to its full open position. The flow then comes to a step P113.

At the step P113, the film transporting motor 17 is actuated through the film transport circuit 18 to initiate a winding action on the film 20. At a step P114, the magnetic recording circuit 14 is actuated to cause the magnetic head 15 to record photographing data such as a date or the like in the magnetic recording part of the film 20. At a step P115, a check is made to find if the camera is in the AEB mode. If so, the flow comes to a step P116. If not, the flow immediately comes to a step P117.

At the step P116, a series scene indication code for indicating that printing be performed under the same condition is recorded in the magnetic recording part of the film 20. The flow then comes to the step P117.

At the step P117, all magnetic recording data to be recorded are recorded on the film 20. Upon completion of the recording, the flow comes to a step P118. At the step P118, one frame portion of the film 20 is transported. When the film transport is detected to have come to an end jointly by the film detecting circuit 16 and the photo-sensor 19, the film transporting motor 17 is brought to a stop by the film transport circuit 18. Then, a shutter release action comes to an end and the flow comes back to the step P101 to wait for a next release. Incidentally, in the AEB mode, the number of times of taking shots in the AEB mode is incremented at every shot with the number of times set at "1" at the end of the first shot of AEB.

Figure 3:
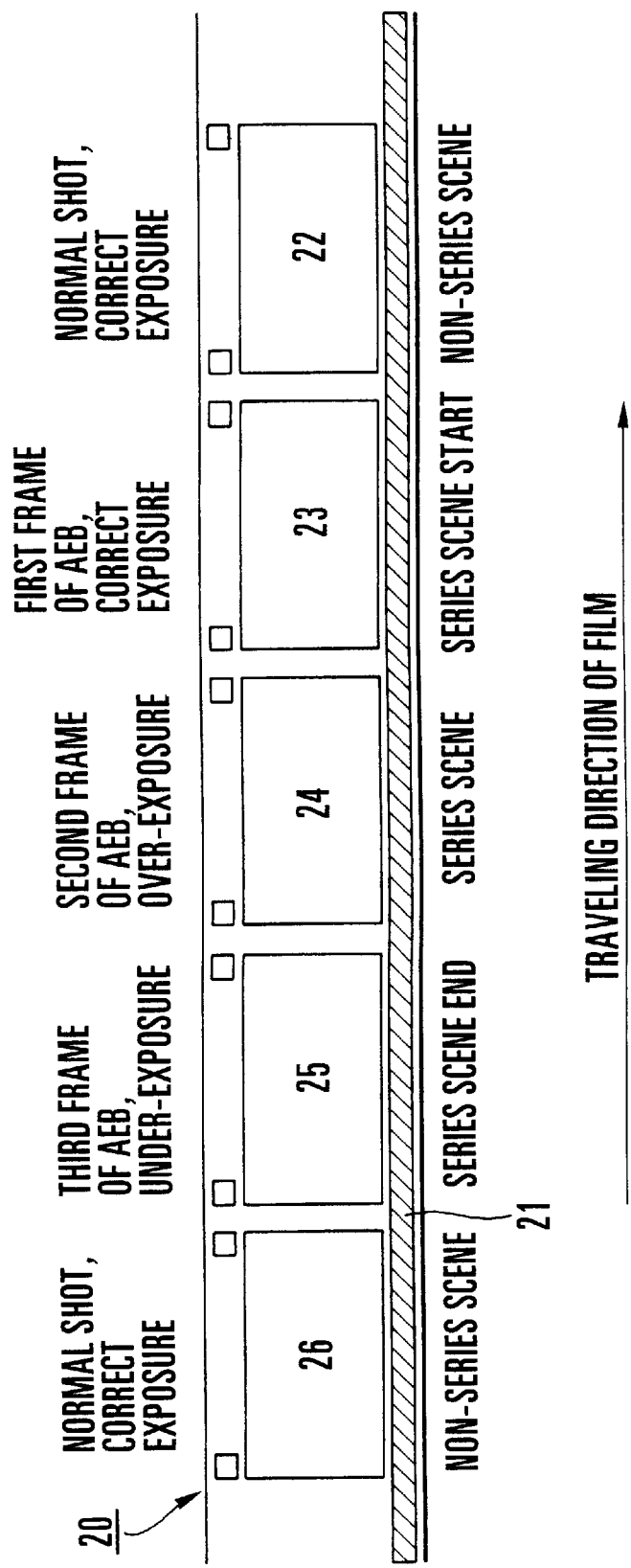
FIG. 3 shows how information relative to a series scene is recorded on a film in the first embodiment of the invention in photographing in the AEB mode.

FIG. 3 shows how information relative to a series scene is recorded on the film in photographing in the AEB mode. The information is recorded in a magnetic recording part 21 of the film 20 as mentioned in the foregoing.

The film 20 is assumed to be exposed to light for photographing frames in series beginning with a frame 22 located first on the right side as viewed on the drawing.

The first photographing frame 22 is exposed in a normal photographing mode at a correct exposure value. Since the shot taken for the frame 22 is a non-series scene, the series scene indication code is not recorded in the magnetic recording part 21 for the frame 22.

Shots from a next photographing frame 23 through a photographing frame 25 are taken in the AEB mode.

The photographing frame 23 is the first frame after the AEB mode is set. Therefore, as described above with reference to the flow chart of FIG. 2, the photographing frame 23 is exposed at a correct exposure value and, a series scene start signal, i.e., the series scene indication code, is recorded in the magnetic recording part 21. The next photographing frame 24 is the second frame of the AEB mode and is, therefore, exposed more than the correct exposure to become over-exposure. Then, a signal indicative of a series scene (the series scene indication code) is recorded in the magnetic recording part 21 for the photographing frame 24. Further, the photographing frame 25 is the third frame of the AEB mode and is, therefore, exposed less than the correct exposure to become under-exposure. Then, a series scene end signal (the series scene indication code) is recorded in the magnetic recording part 21 for the photographing frame 25.

A photographing frame 26 is a frame photographed in the normal photographing mode at the correct exposure like the photographing frame 22, and no series scene indication code is recorded.

Figure 4:
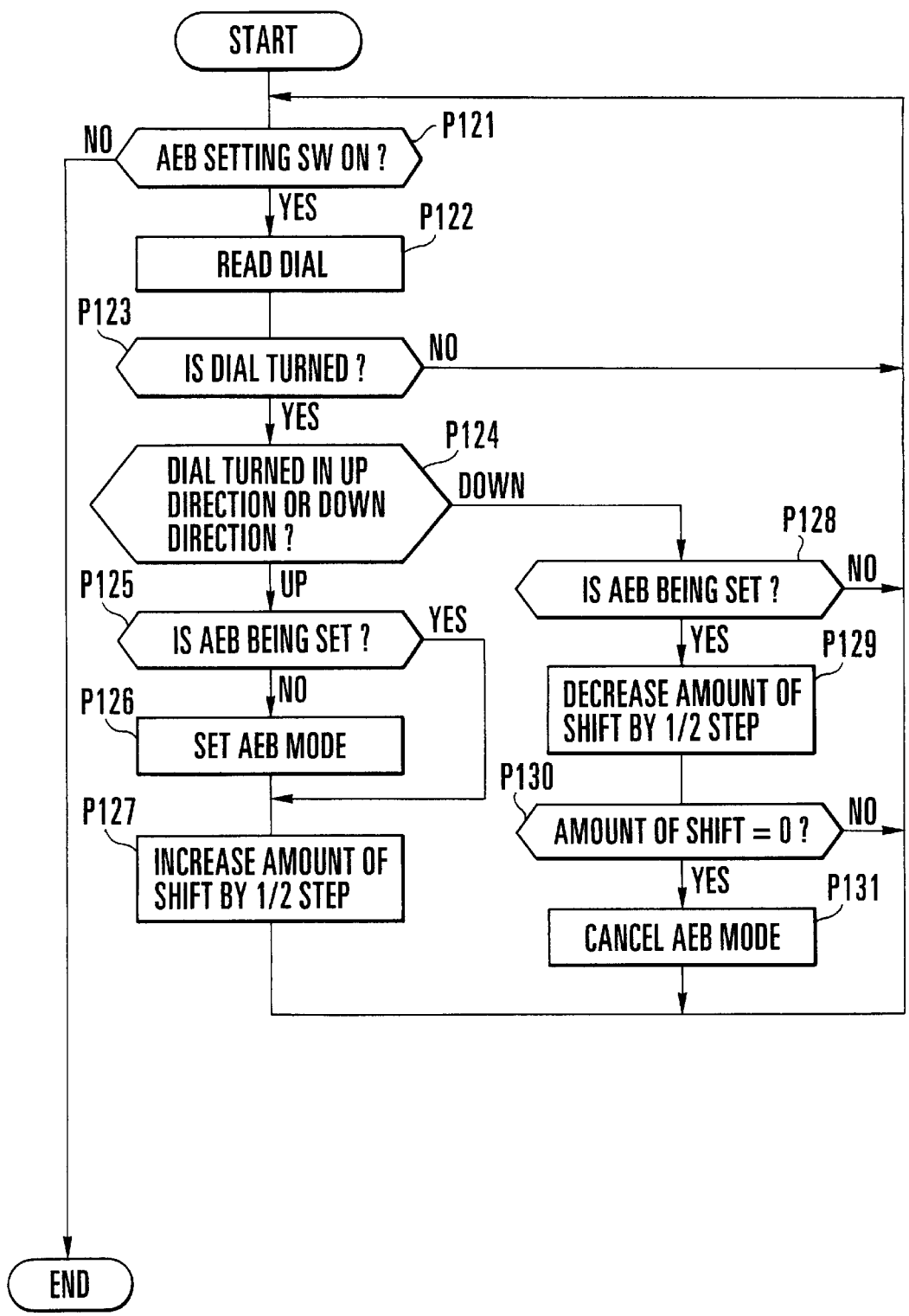
FIG. 4 is a flow chart showing a setting action of the AEB mode in the first embodiment of the invention.

FIG. 4 is a flow chart showing a flow of operation relative to an AEB mode setting action executed in detecting the states of various switches of the camera.

At a step P121 of FIG. 4, a check is made to find if the AEB setting switch 11 is in an on-state. If not, the AEB setting action comes to an end. If so, the flow of operation proceeds to a step P122. At the step P122, a check is made to find if the dial 13 has been turned. If so, the turning direction and the turning amount of the dial 13 are read out. The flow then comes to a step P123. At the step P123, a check is made to find from the information read by the step P122 if the dial 13 has been turned since the state of the dial 13 was last read out. If not, the flow comes back to the step P121 to make a check again for the state of the AEB setting switch 11. If so, the flow comes to a step P124.

At the step P124, a check is made for the turning direction of the dial 13. The flow comes to a step P125 if the turning direction is found to be the increasing (UP) direction and to a step P128 if it is found to be the decreasing (DOWN) direction.

The operation to be performed when the dial 13 is found to have been turned in the increasing direction is first described as follows.

In this case, the flow comes from the step P124 to the step P125. At the step P125, a check is made to find if the AEB mode is being set. If so, the flow comes to a step P127. If not, the flow comes to a step P126.

At the step P126, the AEB mode is set. Then, a display is made at the display part 6 to show "AEB mode" and "series scene". After that, the flow comes to the step P127. When the camera is not in the AEB mode, the above-stated steps enable the AEB mode to be set with the dial 13 turned in the increasing direction while keeping the AEB setting switch 11 in its on-state.

At the step P127, the exposure shifting amount of the AEB is increased by ½ step to the side of over-exposure from the current exposure shifting amount. The flow then comes back to the step P121.

With the dial 13 turned in the increasing (UP) direction while keeping the AEB setting switch 11 in its on-state, the AEB mode is set and the exposure shifting amount is also set according to the turning amount of the dial 13.

Next, the operation to be performed in a case where the dial 13 is found to have been turn in the decreasing direction at the step P124 is next described as follows.

In that case, the flow of operation comes from the step P124 to the step P128. At the step P128, a check is made to find if the AEB mode is being set. If so, the flow comes to a step P129. If not, the flow comes back to the step P121.

At the step P129, the exposure shifting amount of the AEB is decreased by ½ step to the side of under-exposure from the current exposure shifting amount. The flow then comes to a step P130. At the step P130, a check is made to find if the exposure shifting amount of the AEB is "0". If not, the flow comes back to a step P121. If so, the flow comes to a step P131. At the step P131, the AEB mode is canceled. At the same time, the display showing "AEB mode" and "series scene" at the display part 6 is erased. The flow then comes back to the step P121.

With the dial 13 turned in the decreasing (DOWN) direction while keeping the AEB setting switch 11 in its on-state, the exposure shifting amount is set according to the turning amount of the dial 13. The AEB mode is arranged to be canceled when the exposure shifting amount becomes "0".

As described above, the AEB mode can be set and canceled and the exposure shifting amount can be set, by turning the dial 13 while keeping the AEB setting switch 11 in its on-state.

When the film 20 exposed in the above-described manner is processed at a photofinishing laboratory, the information recorded in the magnetic recording part of the film 20 is read out by a film printing machine. Then, a plurality of successive frames set as a series scene are processed in such a way as to have their colors and brightness corrected under the same condition.

Therefore, it is possible to obtain photographs of consecutively differentiated exposures even from a negative film used in the AEB mode like in the case of photographing with a reversal film.

(Second Embodiment)

Figure 5:
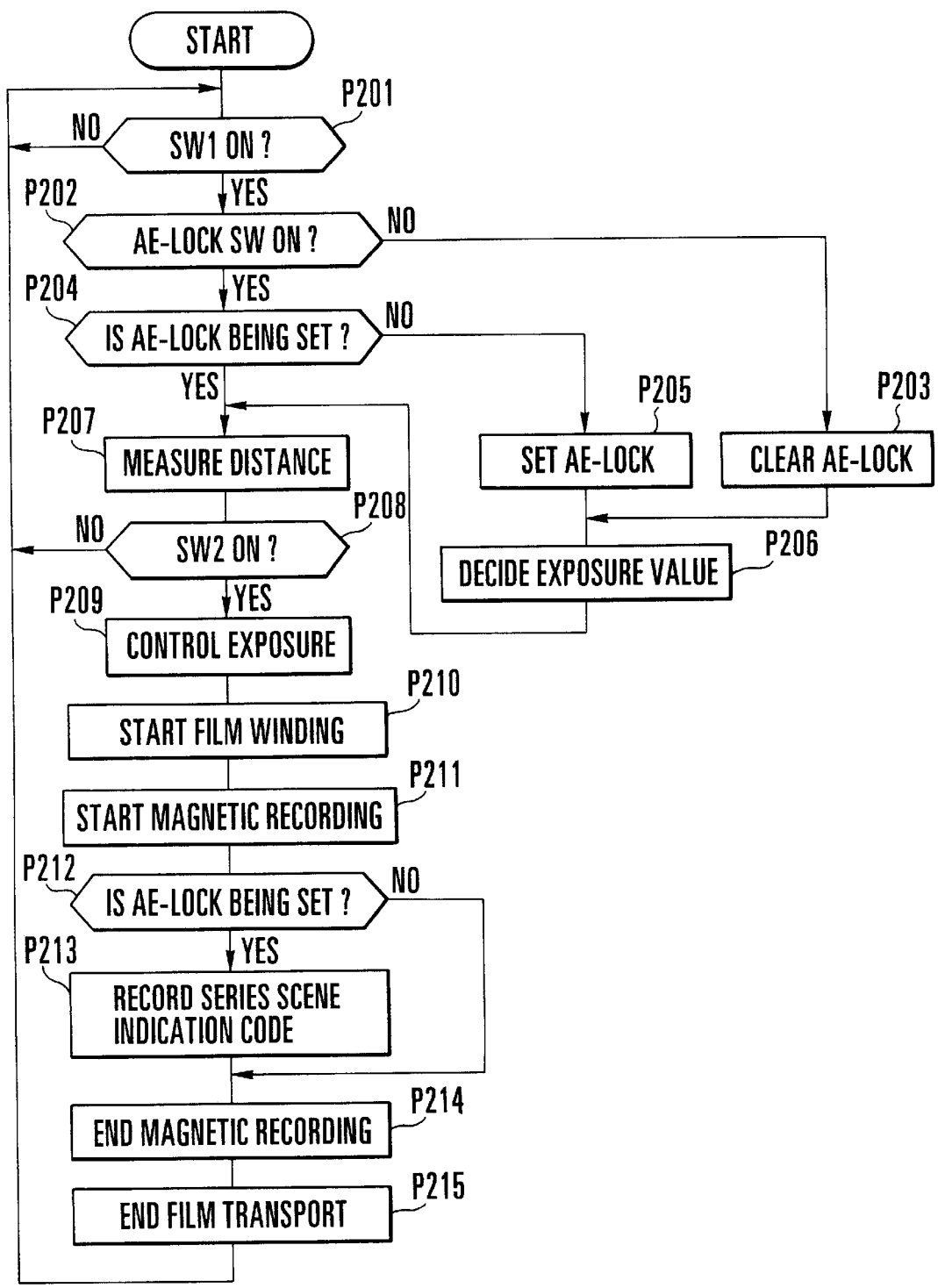
FIG. 5 is a flow chart showing an operation to be performed by a camera capable of magnetic recording in a second embodiment of the invention.

FIG. 5 is a flow chart showing the operation of a microcomputer to be performed in photographing in the AE lock mode with a camera capable of magnetic recording arranged as a second embodiment of the invention. The circuit arrangement of the second embodiment is the same as that of the first embodiment shown in FIG. 1 and is, therefore, omitted from the following description.

The microcomputer 1 of the camera is arranged to execute initial setting processes of varied kinds when a main switch which is not shown is turned on. After that, the flow of operation begins from a step P201 of FIG. 5.

At the step P201, a check is made to find if the switch SW1 is in an on-state. If not, the flow waits until the switch SW1 is turned on. When the switch SW1 is found to be in its on-state, the flow comes to a step P202. At the step P202, a check is made to find if the switch AE-LOCK (AE lock switch 12) is in an on-state. If so, the flow comes to a step P204. If not, the flow comes to a step P203.

At the step P203, since the switch AE-LOCK is in an off-state, a flag AE-LOCK is cleared to cancel an AE locked state and a display showing "series scene" at the display part 6 is erased, if the camera has been set in the AE locked state. If the camera is not in the AE locked state, the flow comes directly to a step P206.

At the step P204, a check is made to find if the camera is currently set in the AE-locked state. If so, the camera is considered to be now in the AE-locked state and the flow proceeds immediately to a step P207. If not, the flow comes to a step P205.

At the step P205, since the camera is not in the AE locked state with the switch AE-LOCK in the on-state, the camera is set in the AE locked state and the display showing "series scene" is made at the display part 6. The flow then comes to the step P206. At the step P206, the luminance of an object to be photographed is detected by the light measuring circuit 2 and an exposure value is decided before the flow comes to the step P207.

An exposure value which is to be used when the AE lock is not applied or an exposure value to be fixed by the AE lock can be decided by these steps.

At the step P207, the distance measuring circuit 3 is caused to perform a distance measuring action. A lens which is not shown is moved to focus it on the object and the flow comes to a step P208. At the step P208, a check is made to find if the switch SW2 is in an on-state. If not, the flow comes back to the step P201. After that, when the switch SW2 is found to be in its on-state, the flow comes to a step P209 for an exposure. At the step P209, the aperture control circuit 5 is caused to stop down the aperture of the lens to a position corresponding to the value decided at the step P206. The shutter control circuit 4 is then caused to control the shutter to be operated at a shutter speed corresponding to the value decided at the step P206. An exposure action is thus executed. The exposure action is brought to an end by causing the aperture control circuit 5 to bring the aperture back to its full open position. The flow then comes to a step P210.

At the step P210, the film transporting motor 17 is caused through the film transport circuit 18 to begin a winding action on the film 20. At a step P211, the magentic head 15 is caused through the magnetic recording circuit 14 to begin recording photographing information or data such as a date, etc., in the magnetic recording part 21 of the film 20. The flow then comes to a step P212.

At the step P212, a check is made to find if the camera is in the AE locked state. If so, the flow comes to a step P213. If not the flow comes to a step P214.

At the step P213, a series scene indication code for indicating that printing be performed under the same condition is recorded in the magnetic recording part 21 of the film 20, and the flow comes to the step P214.

At the step P214, all magnetic recording data to be recorded are recorded on the film 20. Upon completion of the data recording, the flow comes to a step P215. At the step P215, when the film 20 is found, by the film detecting circuit 16 and the photo-sensor 19, to have been moved, as much as one frame portion, to a predetermined position, a shutter release action is brought to an end by stopping the film transporting motor 17 through the film transport circuit 18. The flow then comes back to the step P201 to wait for a next release.

Figure 6:
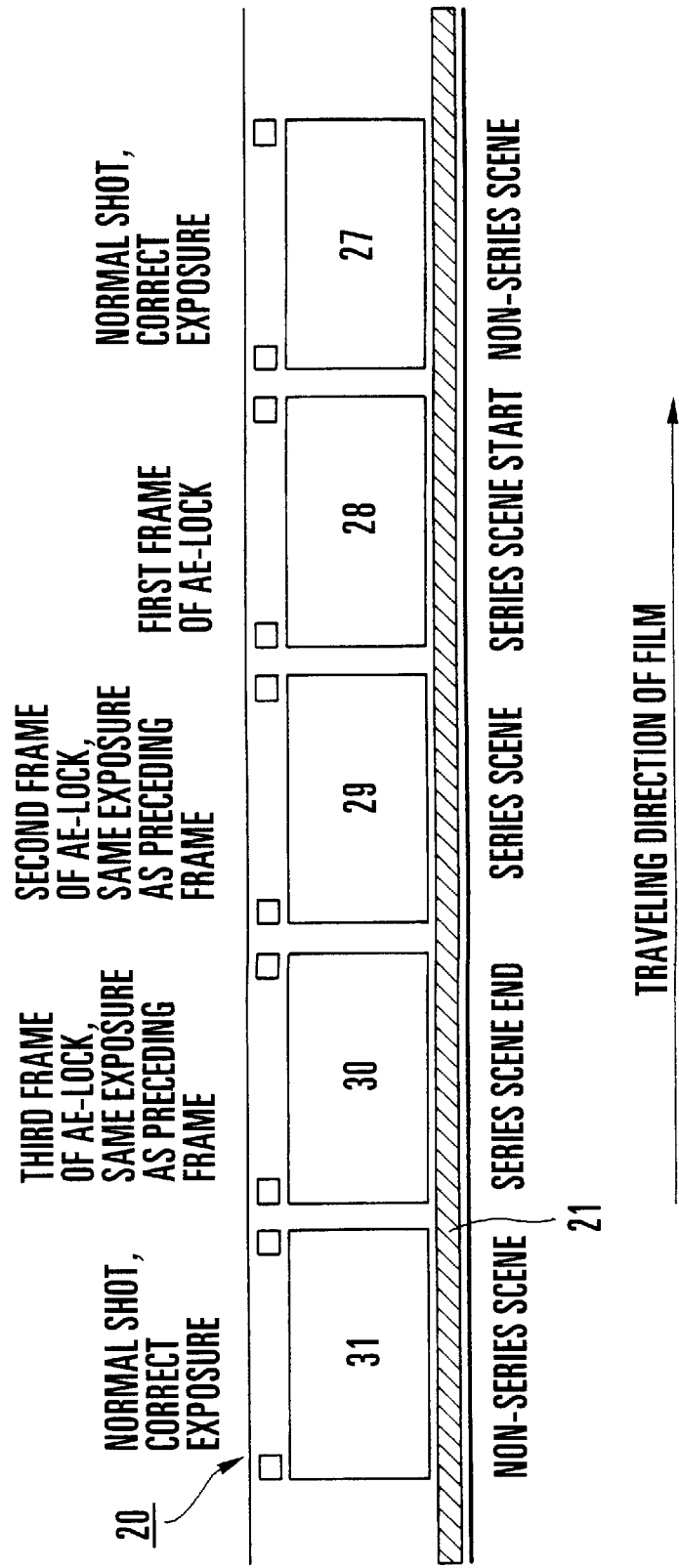
FIG. 6 shows how information relative to a series scene is recorded on a film in the second embodiment of the invention in photographing in the AE lock state.

FIG. 6 shows how information relative to a series scene is recorded on the film 20 during photographing in the AE lock mode. The information is recorded in the magnetic recording part 21 of the film 20.

Referring to FIG. 6, the photographing frames of film 20 are assumed to be serially exposed to light beginning with a photographing frame 27 disposed at the right end of the drawing.

A shot for the first photographing frame 27 is taken in the "normal photographing mode" at a correct exposure value. Since the photographing frame 27 is a non-series scene, the series scene indication code is not recorded.

Shots for a next photographing frame 28 through a photographing frame 30 are taken in the AE lock mode.

The photographing frame 28 is the first frame after the AE lock mode is set. Therefore, as described with reference to the flow chart of FIG. 5, the photographing frame 28 is exposed at a correct exposure value and a series scene start signal, i.e., the series scene indication code, is recorded in the magnetic recording part 21. The next photographing frame 29 is the second frame in the AE lock mode and is, therefore, exposed at the same exposure value as the preceding frame. Then, a signal indicative of a series scene (the series scene indication code) is recorded in the magentic recording part 21 for the photographing frame 29. The photographing frame 30 is the third frame in the AE lock mode. The photographing frame 30 is, therefore, exposed at the same exposure value as the preceding frame and a series scene end signal (the series scene indication code) is recorded in the magnetic recording part 21.

Another photographing frame 31 is a normal photographing frame. A shot for the photographing frame 31 is, therefore, taken in the normal photographing mode like the photographing frame 27, and no series scene indication code is recorded.

As described above, in taking shots with the switch AE-LOCK turned on, the signals indicative of a series scene are recorded in the magnetic recording part 21 of the film 20.

Further, as mentioned in the description of the first embodiment, in printing pictures from the film on which the signals indicative of a series scene are recorded, these pictures are printed under the same condition. The second embodiment thus ensures that the pictures can be printed under the same exposure condition as the exposure condition obtained when the AE lock is applied.

(Third Embodiment)

Figure 7:
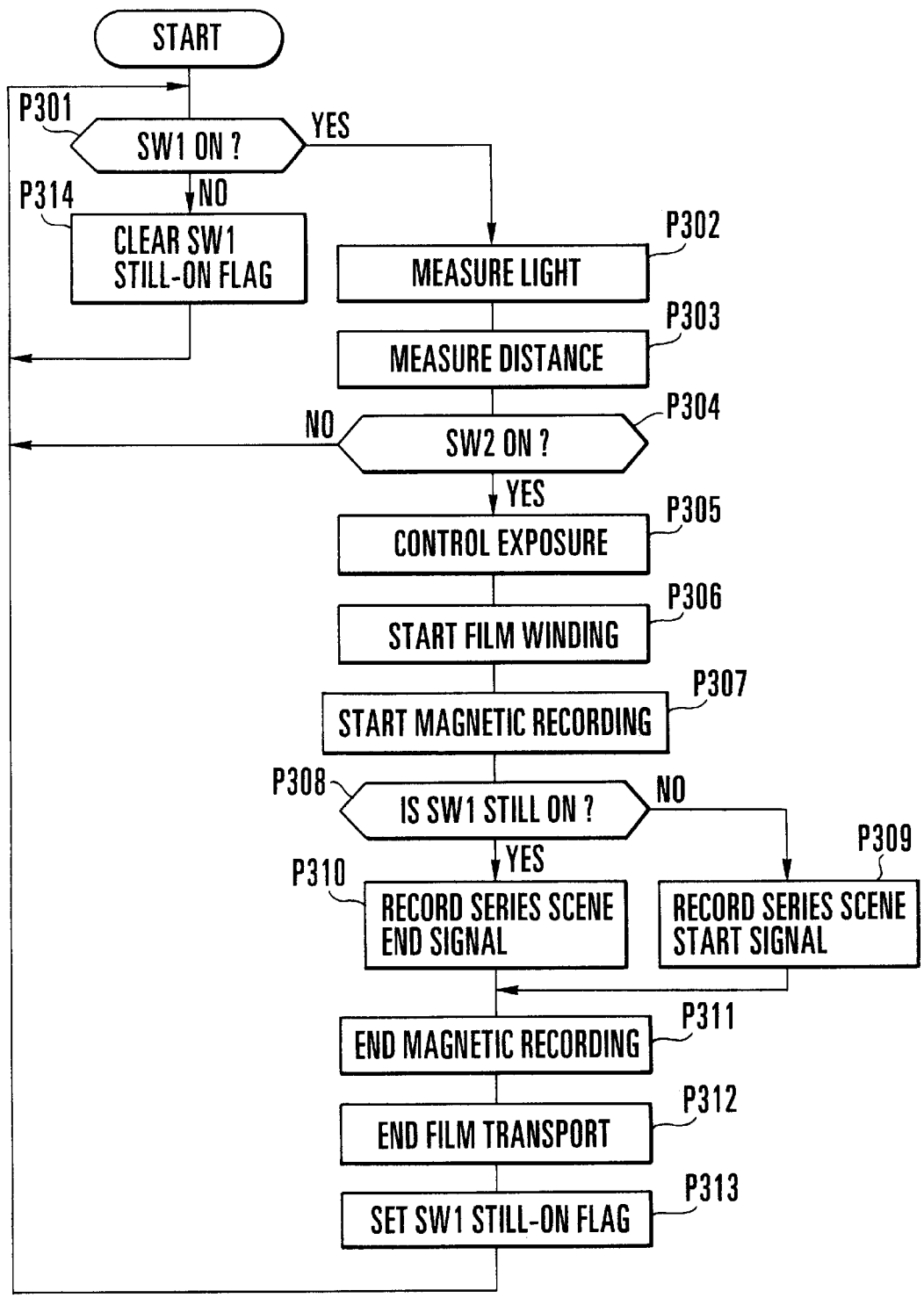
FIG. 7 is a flow chart showing a series of actions to be performed by a camera capable of magnetic recording in a third embodiment of the invention.

FIG. 7 is a flow chart showing a series of actions of a camera which is capable of performing magnetic recording and arranged as a third embodiment of the invention. The circuit arrangement of the camera is the same as the camera shown in FIG. 1 and is, therefore, omitted from the following description.

The microcomputer 1 of the camera executes initial setting of varied kinds when a main switch which is not shown is turned on. After that, the microcomputer 1 begins to operate from a step P301 of FIG. 7.

At the step P301, a check is made for the state of the switch SW1 which is provided for light and distance measuring actions and is connected to the microcomputer 1. If the switch SW1 is found to be not in an on-state, the flow of operation comes to a step P314 to clear a flag indicating that the switch SW1 is still in an on-state. The flow then comes back to the step P301. In other words, these steps are repeated as long as the switch SW1 remains in an off-state.

When the switch SW1 is found to be in its on-state at the step P301, the flow proceeds to a step P302. At the step P302, an exposure value is decided by causing the light measuring circuit 2 to detect the luminance of an object to be photographed. At a next step P303, the distance measuring circuit 3 is caused to measure a distance to the object. The lens which is not shown is moved to be focused on the object. At a step P304, a check is made to find if the switch SW2 is in an on-state. If so, the flow comes to a step P305 for an exposure. If not, the flow comes back to the step P301.

At the step P305, the aperture control circuit 5 is caused to stop down the aperture of the lens to a position corresponding to an aperture value decided at the step P302. An exposure action is next performed by causing the shutter control circuit 4 to control and operate the shutter at a shutter speed corresponding to a value decided at the step P302. After completion of the exposure action, the flow comes to a step P306.

At the step P306, the film transporting motor 17 is caused through the film transport circuit 18 to begin a film winding action on the film 20. At a step P307, the magnetic head 15 is caused through the magnetic recording circuit 14 to begin to record photographing data, such as a date, in the magnetic recording part 21 of the film 20.

At a step P308, the flag-indicating that the switch SW1 is still in an on-state is checked to find if the switch SW1 is still in an on-state. If not, the flow comes to a step P309 to record the series scene start signal in the magnetic recording part 21 of the film 20 and then comes to a step P311. If the switch SW1 is found to be still in an on-state at the step P308, the flow comes to a step P310. At the step P310, the series scene end signal is recorded in the magnetic recording part 21 of the film 20. After the series scene end signal is recorded, the flow comes to the step P311.

At the step P311, the magnetic recording action on the magnetic recording part 21 is terminated with all the magnetic recording data to be recorded are completely recorded on the film 20. At a step P312, when the film 20 is found, by the film detecting circuit 16 and the photo-sensor 19, to have been brought to a predetermined position by moving it as much as one frame amount, the film transporting motor 17 is brought to a stop through the film transport circuit 18. The flow then comes to a step P313.

At the step P313, the release action is brought to and end by setting the flag indicating that the switch SW1 is still in an on-state. The flow then comes back to the step P301 to wait for a next release.

Figure 8:
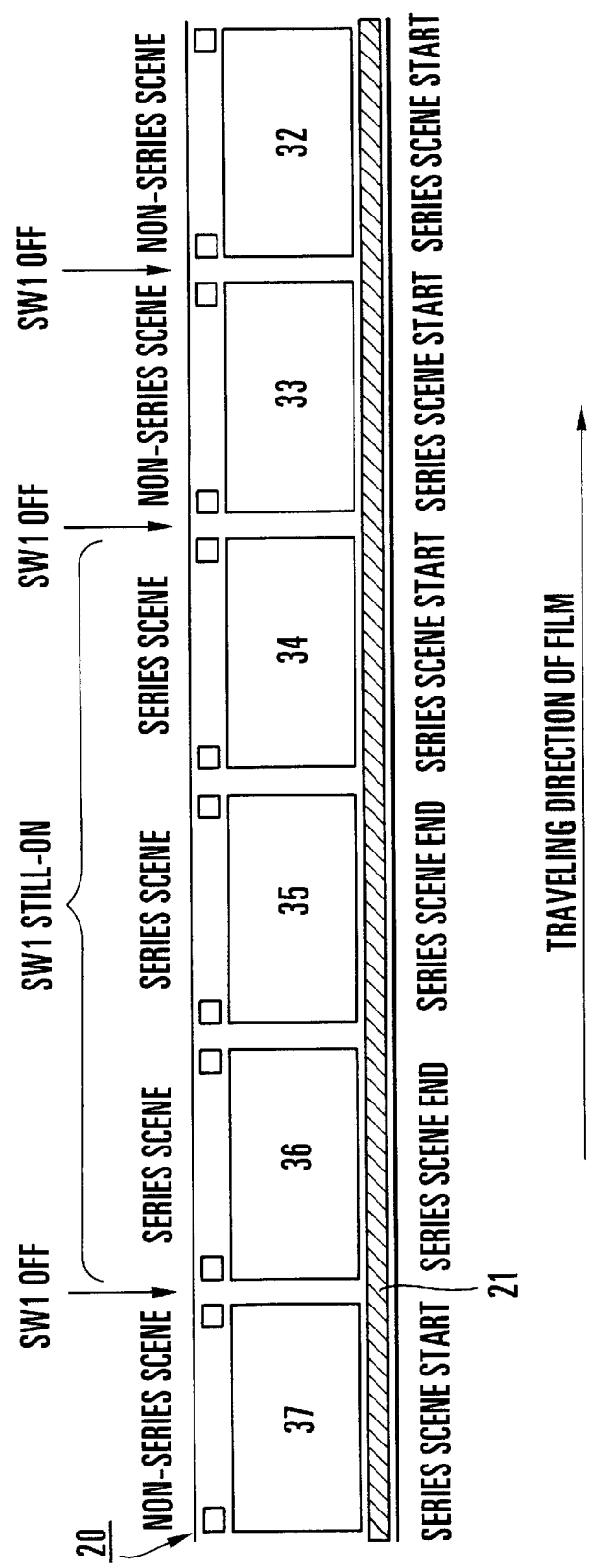
FIG. 8 shows how information relative to a series scene is recorded on a film in the third embodiment of the invention when photographing is continuously performed.

FIG. 8 shows how information relative to a series scene is recorded on the film 20. The information is recorded in the magnetic recording part 21 of the film 20.

Referring to FIG. 8, the photographing frames of film 20 are assumed to be serially exposed to light beginning with a photographing frame 32 disposed at a right end as shown in the drawing.

Since a shot for the first photographing frame 32 is first taken (by releasing the shutter) after the switch SW1 for light and distance measuring actions is turned on from its off-state, and the flag indicating that the switch SW1 is still in an on-state is cleared (see FIG. 7), the series scene start signal is recorded in the magnetic recording part 21.

A shot is taken (a release is made) for a next photographing frame 33 with the switch SW1 turned off once after taking the shot for the preceding photographing frame 32. The series scene start signal is also recorded in the magnetic recording part 21 also for the photographing frame 33.

A shot is taken for a photographing frame 34 also with the switch SW1 turned off once after taking the shot for the preceding photographing frame 33. The series scene start signal is also recorded in the magnetic recording part 21 also for the photographing frame 34.

A shot is taken for a next photographing frame 35 with the switch SW1 kept in an on-state after taking the shot for the preceding photographing frame 34. Since the flag indicating that the switch SW1 is still in an on-state is set in this case, the series scene end signal is recorded in the magnetic recording part 21.

A shot is taken for a photographing frame 36 also without turning off the switch SW1. The series scene end signal is recorded for the photographing frame 36.

A shot is taken for a further photographing frame 37 with the switch SW1 turned off once after taking a shot for the preceding photographing frame 36. The series scene start signal is recorded in the magnetic recording part 21 for the photographing frame 37.

The signal indicative of a series scene will be practically explained. A series scene taken in the consecutive photographing frames begins from a frame which immediately precedes a frame at which a series scene end signal is recorded and which has the series scene start signal recorded. The series scene is maintained as long as the series scene end signal is consecutively recorded. During printing, therefore, upon determining the above-stated status, a printing process is performed under the same condition, beginning with the frame which immediately precedes the frame at which the series scene end signal is recorded and continuing as long as the series scene end signal is consecutively recorded.

More specifically, in the case of FIG. 8, a series scene begins with the photographing frame 34 which has the series scene start signal and immediately precedes the photographing frame 35 for which the series scene end signal is recorded. The series scene then consecutively includes the photographing frames 35 and 36 at which the series scene end signal is recorded. Other photographing frames carry non-series scenes. With the embodiment arranged in this manner, the photographing frames can be simply indicated as a series scene even in a case where a photographing frame irregularly becomes a series scene or non-series scene depending on the state obtained after a shot is taken for each of frames.

As described above, in a case where shots are taken (shutter release are made) a plurality of times with the switch SW1 left in an on-state, all the frames that are used for photographing with the switch SW1 left in an on-state are arranged to show a series scene.

While the embodiment is arranged to take a series scene only when the switch SW1 is in an on-state, the arrangement may be changed to have all shots that are taken while a light measuring action is in process become a series scene in a case where the camera is of the kind arranged to carry on the light measurement for a predetermined period of time even after the switch SW1 is turned off.

The advantageous effects of the above-described embodiments are recapitulated as follows.

According to the arrangement of the first embodiment, in the AEB photographing mode, a signal indicating a series scene is recorded in the magnetic recording part 21 provided on the film 20, so that a plurality of frames can be printed under the same condition irrespective of continuous shooting or single shooting. Therefore, a plurality of frames for which shots are taken by varying exposure values in the AEB mode can be printed as desired by the camera operator. In other words, the arrangement of the first embodiment gives photographs of different exposures as intended by the camera operator.

The second embodiment is arranged to record a signal indicating a series scene in the magnetic recording part 21 even in the event of taking shots by applying the AE lock. Therefore, photographs can be obtained at exposure values as intended by the operator.

In the case of the third embodiment, the camera is arranged to record a signal indicating a series scene not only for normal continuous shooting but also in cases where shots are taken apparently in succession, i.e., where a plurality of shots are taken one after another by waiting intermittently for shutter opportunities while keeping the switch SW1 alone in an on-state (without temporarily turning off the switch SW1). The photographs (shots) thus taken can be printed under the same condition so as to make them closer to what is intended by the camera operator.

Further, the arrangement of providing a display which indicates a series scene at the display part of the camera in a case where the camera is automatically set in the mode of series scene, as in the case of the first embodiment, effectively enables the camera operator to know beforehand that photographs can be obtained as intended by the camera operator.

(Fourth Embodiment)

Figure 9:
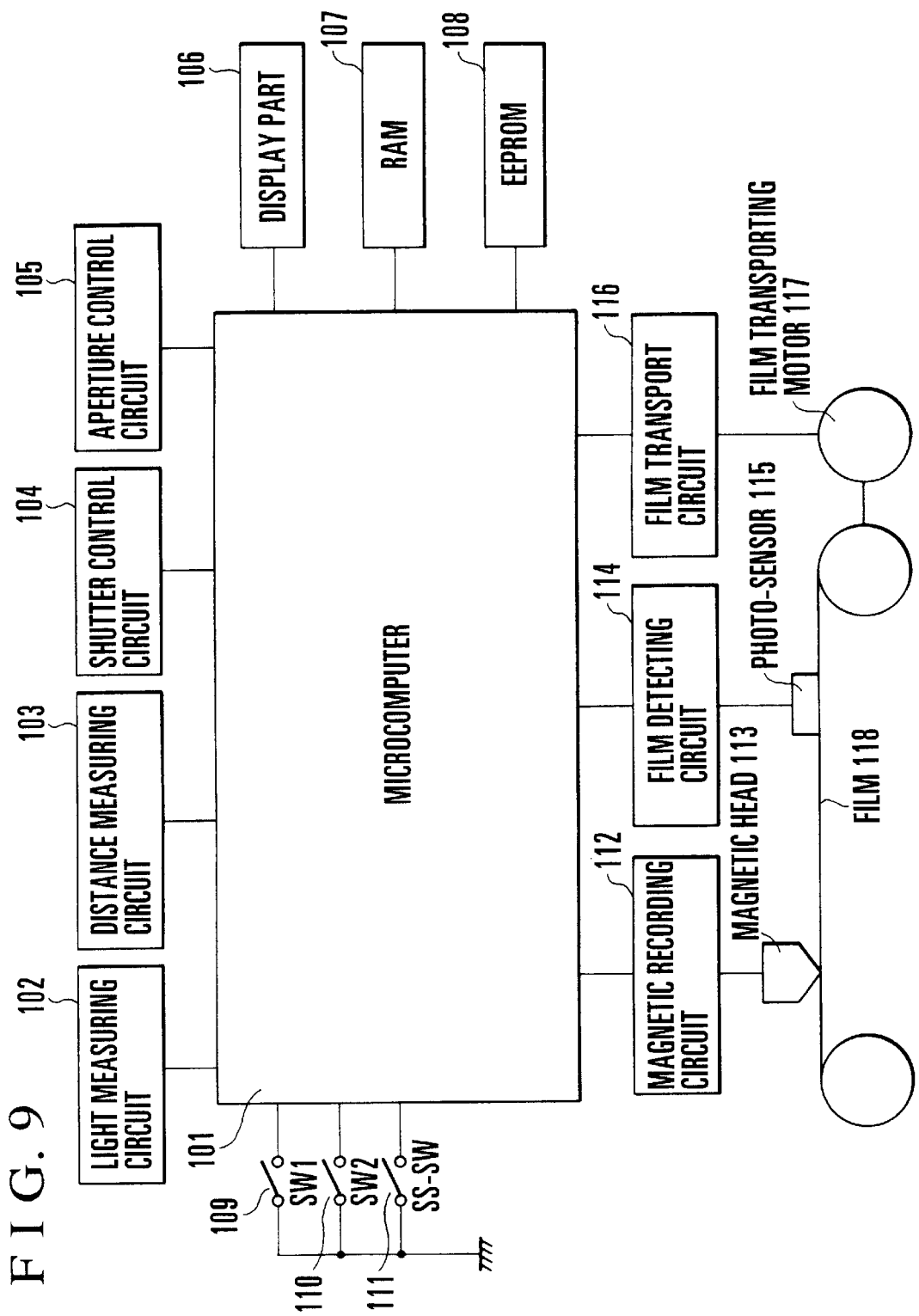
FIG. 9 is a block diagram showing the arrangement of circuits of a camera capable of magnetic recording which is arranged as a fourth embodiment of the invention.

FIG. 9 is a block diagram showing the arrangement of circuits of a camera which is of the kind using a film provided with a magnetic recording part and arranged as a fourth embodiment of the invention.

Referring to FIG. 9, a microcomputer 101 is arranged to control the whole camera. A light measuring circuit 102 is arranged to measure the luminance of an object to be photographed. A distance measuring circuit 103 is arranged to detect a focus position for moving a photo-taking lens to the focus position. A shutter control circuit 104 is arranged to control the operation of a shutter for an exposure action. An aperture control circuit 105 is arranged to control the stopping-down amount of an aperture provided in the lens. A display part 106 is arranged to display information of varied kinds including a shutter speed, an aperture value, etc. When the camera is set in a series scene mode, the display part 106 makes a display indicating "series scene".

A RAM 107 is arranged to serve as an external storage means. An EEPROM 108 is arranged to serve as an external nonvolatile storage means. A light-and-distance measuring switch 109 (hereinafter referred to as a switch SW1) is provided for initiation of light and distance measuring actions. A release switch 110 (hereinafter referred to as a switch SW2) is provided for initiation of a shutter release action. A series scene switch 111 (hereinafter referred to as a switch SS-SW) is provided for setting the series scene mode by the camera operator. A magnetic recording circuit 112 is arranged to control a magnetic head 113 which is provided for writing photographing information on a film which is provided with a magnetic recording part. A film detecting circuit 114 is arranged to detect a film transporting speed and a film position by controlling a photo-sensor 115. A film transport circuit 116 is arranged to control a film transporting motor 117 for transporting the film. A film 118 has the magnetic recording part as mentioned above.

Figure 10:
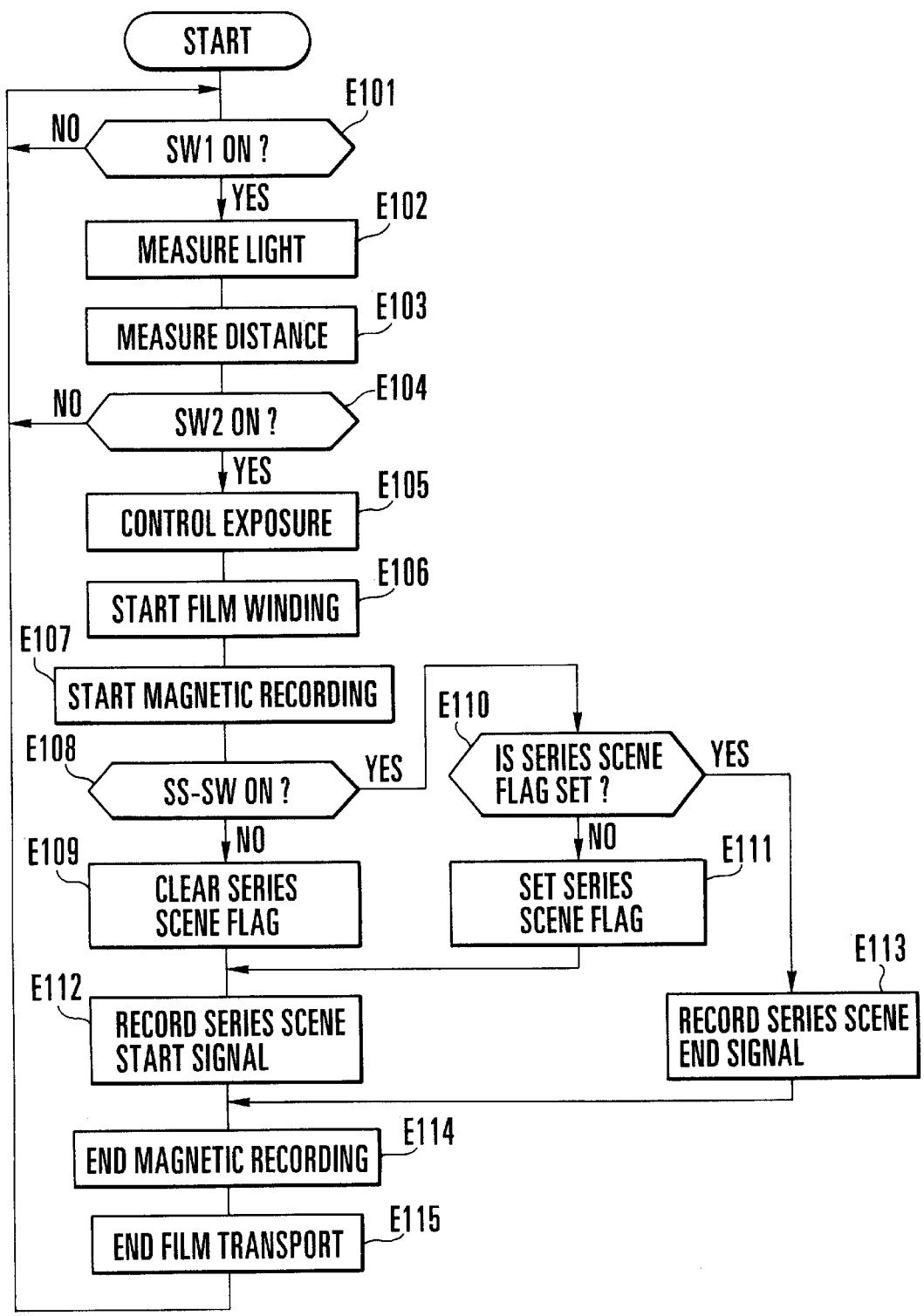
FIG. 10 is a flow chart showing actions to be performed in the fourth embodiment in a case where a switch SS-SW is of an ON/OFF switching type.

FIG. 10 is a flow chart showing an operation of the microcomputer 101 shown in FIG. 9. The operation shown in this flow chart is performed in a case where the switch SS-SW is of an on/off switching type.

When a main switch which is not shown is turned on, the microcomputer 101 comes to operate beginning with a step E101.

At the step E101, a check is made to find if the switch SW1 is turned on. If not, the flow waits at the step E101 until the switch SW1 is turned on. When the switch SW1 is turned on, the flow proceeds to a step E102 for the commencement of the light and distance measuring actions. At the step E102, the light measuring circuit 102 is caused to measure the quantity of light of an object to be photographed for deciding a correct exposure value. After an amount of exposure is decided, an aperture value and a shutter speed are decided. At a next step E103, the distance measuring circuit 103 is caused to measure a distance to the object. A lens which is not shown is moved so as to focus the lens on the object, and then the flow comes to a step E104.

At the step E104, a check is made to find if the switch SW2 is in an on-state. If not, the flow comes back to the step E101. If so, the flow proceeds to a step E105 for an exposure action. At the step E105, the aperture control circuit 105 is first activated to stop down the aperture of the lens to the position of aperture value decided at the step E102. An exposure action is executed by activating the shutter control circuit 104 to control and operate a shutter at the shutter speed decided at the step E102. The exposure action is terminated by causing the aperture control circuit 105 to bring the aperture back to its full open position.

At a step E106, the film transporting motor 117 is activated through the film transport circuit 116 to begin winding the film 118. At a step E107, the magnetic recording circuit 112 is activated to cause the magnetic head 113 to begin recording photographing data such as a date, etc., in the magnetic recording part of the film 118. At a step E108, a check is made to find if the switch SS-SW has been turned on. If not, the flow comes to a step E109. At the step E109, since the switch SS-SW is not in an on-state, if a series scene (SS) flag of the RAM 107 has been set, the SS flag is cleared. The flow then comes to a step E112.

If the switch SS-SW is found to be in an on-state at the step E108, the flow comes to a step E110. At the step E110, a check is made to find if the series scene flag of the RAM 107 has been set. If not, the flow comes to the step E111. At the step E111, the series scene flag of the RAM 107 is set and the flow comes to the step E112.

At the step E112, a series scene start signal is recorded in the magnetic recording part 119 of the film 118. The step E112 is arranged to be executed when the switch SS-SW is in an off-state and also when the first shot is taken after the switch SS-SW is turned on.

Further, if the series scene flag is found at the step E110 as to have been set, the flow comes to a step E113. At the step E113, a series scene end signal is recorded in the magnetic recording part 119 of the film 118. The step E113 is executed for the second shot and shots taken following the second shot after the switch SS-SW is turned on.

At a next step E114, the magnetic recording action is terminated when all the magnetic recording data to be recorded are recorded on the film 118. At a step E115, when the film detecting circuit 114 and the photo-sensor 115 detect that the film 118 has been moved as much as one frame portion thereof to reach a predetermined position, the film transport circuit 116 is caused to bring the film transporting motor 117 to a stop. After that, the flow comes back to the step E101 to wait for a next release.

As described above, the series scene start signal is recorded on the film 118 when the switch SS-SW is in an off-state and also for the first shot taken after the switch SS-SW is turned on. Further, the series scene end signal is recorded for each of the second shot and shots taken following the second shot after the switch SS-SW is turned on. This arrangement is as shown in FIG. 11.

Figure 11:
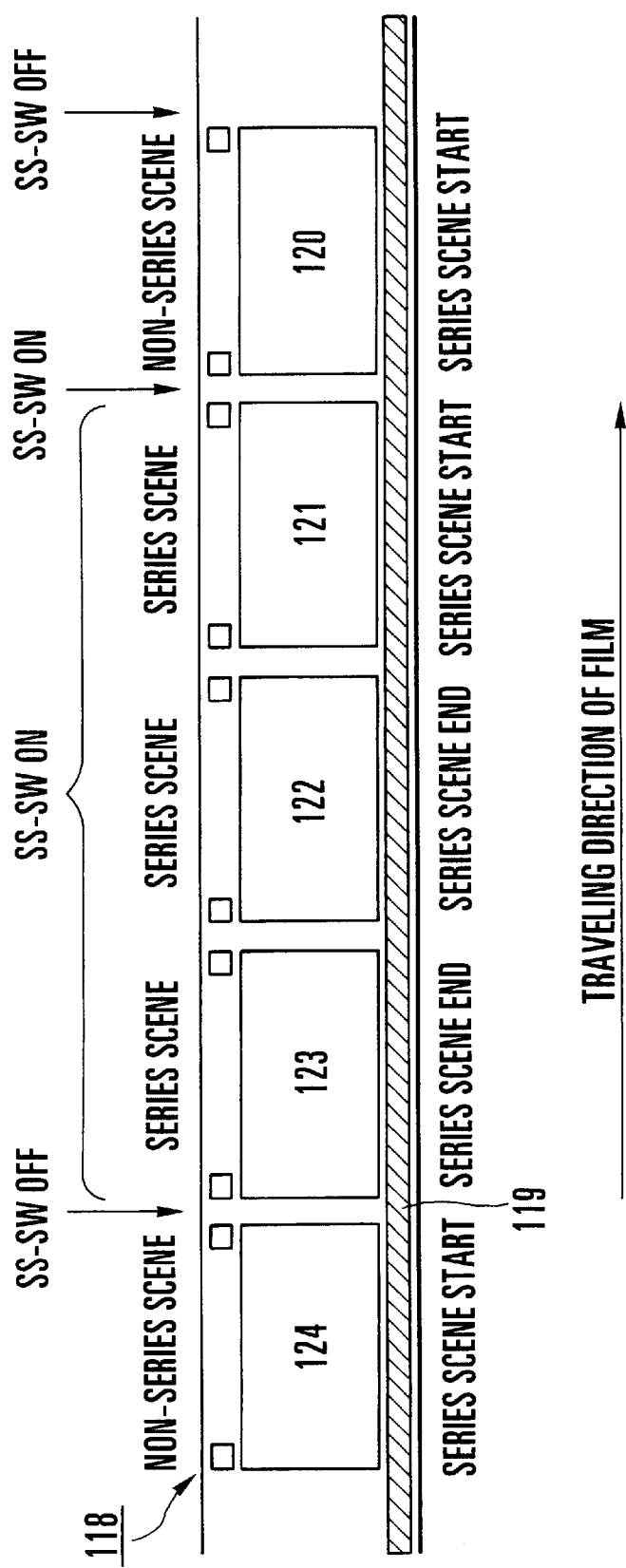
FIG. 11 shows how information relative to a series scene is recorded on a film when photographing is performed with the switch SS-SW in on-state and off-state, respectively, in the fourth embodiment of the invention.

FIG. 11 shows how information relative to a series scene is recorded on the film 118 when shots are taken with the switch SS-SW turned on and also with the switch SS-SW turned off. The information is recorded in the magnetic recording part 119 of the film 118.

Referring to FIG. 11, the photographing frames of film 118 are assumed to be serially exposed to light beginning with a photographing frame 120 disposed at a right end as shown in the drawing.

A shot for the first photographing frame 120 is first taken (by releasing the shutter) with the switch SS-SW in an on-state. As described above with reference to the flow chart of FIG. 10, the series scene start signal is recorded for the photographing frame 120.

Next, a case where a shot is taken with the switch SS-SW turned on before a shot is taken for a photographing frame 121 is described as follows.

The photographing frame 121 is a frame for which a shot is first taken after the switch SS-SW is turned on. The series scene start signal is recorded in the magnetic recording part 119 at this frame. After that, when a shot is taken for a next photographing frame 122 with the switch SS-SW left in an on-state, the series scene end signal is recorded in the magnetic recording part 119 of the film 118. The series scene end signal is also recorded for another photographing frame 123 when a shot is taken for the frame 123 with the switch SS-SW left in an on-state.

A shot for a next photographing frame 124 is taken with the switch SS-SW in an off-state. The series scene start signal is recorded in the magnetic recording part 119 of the film 118 for the photographing frame 124.

Information indicative of a series scene is recorded in the above-stated manner. During printing, when the "series scene start" signal and the "series scene end" signal successively come, the first frame is judged to be a frame of the first of the series scene. When the "series scene start" signal is detected after the "series scene end" signal, a frame located immediately before the "series scene start" signal is judged to be a frame of the last of the series scene. In the case of FIG. 11, the photographing frames 121, 122 and 123 are made to be printed under the same condition.

In a case where the switch SS-SW connected to the microcomputer 101 shown in FIG. 9 is a push switch and is arranged to be turned on only when it is pushed, the microcomputer 101 operates in a manner as described below with reference to FIG. 12, which is a flow chart.

Figure 12:
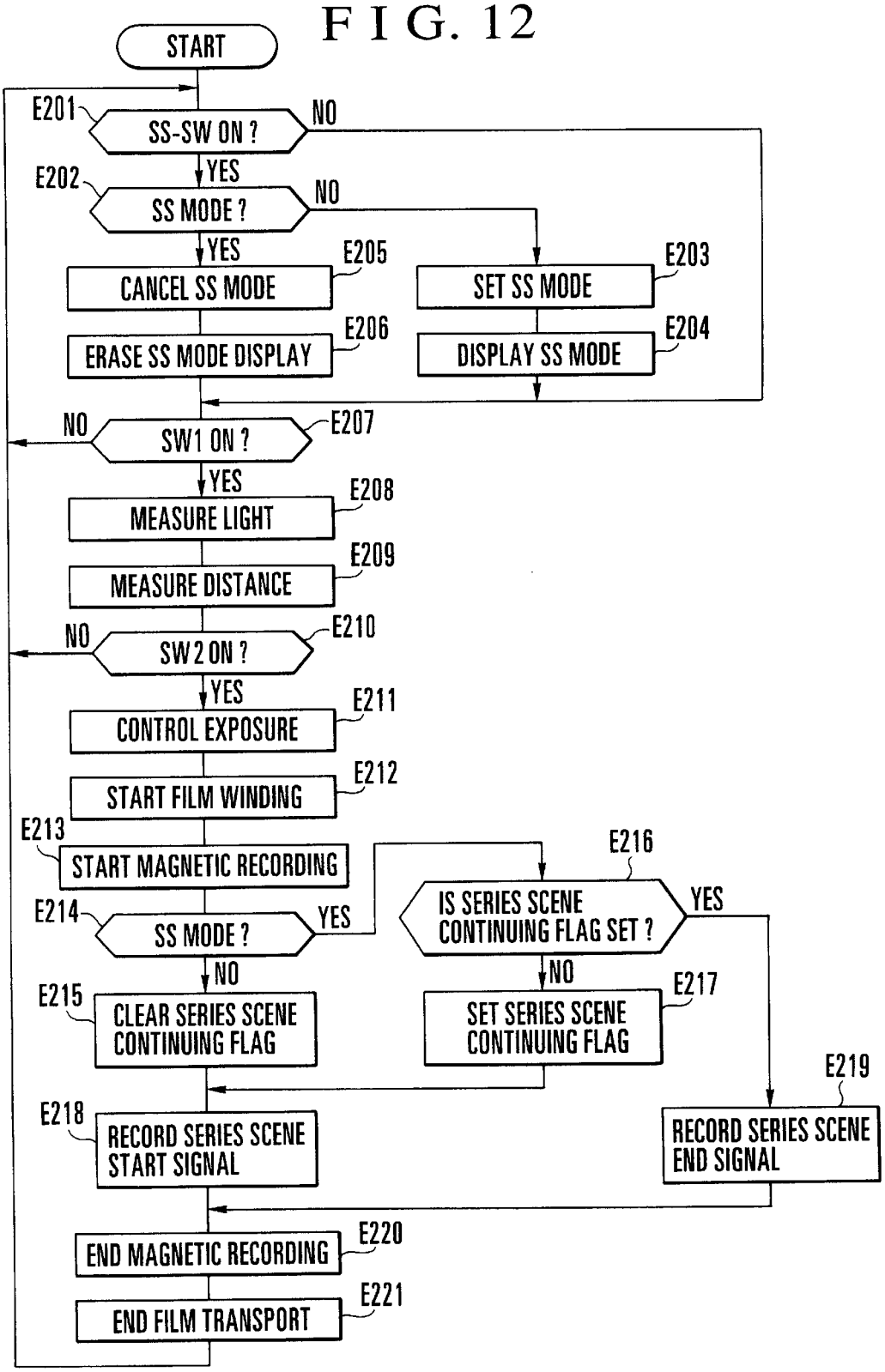
FIG. 12 is a flow chart showing an operation of the fourth embodiment of the invention performed in a case where the switch SS-SW is of a pushing type.

Referring to FIG. 12, the microcomputer 101 begins to operate from a step E201 when a main switch which is not shown is turned on.

At the step E201, a check is made to find if the switch SS-SW is in an on-state. If not, the flow of operation comes to a step E207. If so, the flow comes to a step E202 to make a check for the state of a flag within the RAM 107. If the flag does not indicate the series scene mode, the flow comes to a step E203. At the step E203, the flag of the RAM 107 is set to show the series scene mode. At a step E204, the display part 106 is caused to make a display showing that the camera is in the series scene mode. The flow comes to the step E207.

If the flag is found at the step E202 to be showing the series scene mode, the flow comes to a step E205. At the step E205, the flag within the RAM 107 is released from a series scene mode indicating state. At a step E206, the display part 106 is caused to erase the display of "series scene". The flow comes to the E207.

The series scene mode is obtained when the switch SS-SW is turned on while the camera is not in the series scene mode. The series scene mode is canceled when the switch SS-SW is turned on while the camera is in the series scene mode. The series scene mode thus can be set and canceled by operating the switch SS-SW.

At the step E207, a check is made for the state of the switch SW1. If the switch SW1 is found to be not in an on-state, the flow comes back to the step E201 to make a check for the state of the switch SS-SW and waits for turning-on of the switch SW1.

If the switch SW1 is found at the step E207 to be in an on-state, the flow comes to a step E208 for the commencement of the light and distance measuring actions. At the step E208, the light measuring circuit 102 is caused to measure the quantity of light of an object to be photographed for deciding a correct exposure value. After an exposure value is decided, an aperture value and a shutter speed are decided. At a step E209, the distance measuring circuit 103 is caused to measure a distance to the object. The lens which is not shown is moved to focus the lens on the object, and the flow comes to a step E210.

At the step E210, a check is made to find if the switch SW2 is in an on-state. If not, the flow comes back to the step E201. If so, the flow comes to a step E211 for an exposure action. At the step E211, the aperture control circuit 105 is caused to stop down the aperture of the lens to its position of the aperture value decided at the step E208. The shutter control circuit 104 is next caused to perform the exposure action by controlling and operating the shutter at the shutter speed decided at the step E208. After that, the exposure action is brought to an end by causing the aperture control circuit 105 to bring the aperture back to its full open position. The flow then comes to a step E212.

At the step E212, the film transporting motor 117 is actuated to begin to perform a winding action on the film 118. At a step E213, the magnetic recording circuit 112 is actuated to cause the magnetic head 113 to begin recording photographing data such as a date, etc., in the magnetic recording part of the film 118. The flow then comes to a step E214.

At the step E214, a check is made for the series scene mode flag of the RAM 107. If the flag does not show the series scene mode, the flow comes to a step E215. At the step E215, since the camera is not in the series scene mode, if a series scene continuing flag is set at the RAM 107, this flag is cleared. The flow then comes to a step E218.

In a case where the result of the check made at the step E214 indicates the series scene mode, the flow comes to a step E216. At the step E216, a check is made to find if the series scene continuing flag is set in the RAM 107. If not, the flow comes to a step E217. At the step E217, the series scene continuing flag is set and the flow comes to the step E218.

At the step E218, the series scene start signal is recorded in the magnetic recording part 119 of the film 118. The step E218 is arranged to be executed when the camera is not in the series scene mode and also when a shot is first taken after the series scene mode is set.

Further, if the series scene continuing flag is found at the step E216 to be in a set state, the flow comes to a step E219. At the step E219, the series scene start signal is recorded in the magnetic recording part 119 of the film 118. The step E219 is executed for the second shot taken after the series scene mode is set and also for shots taken following the second shot.

At a step E220, the magnetic recording action is terminated when all the magnetic recording data to be recorded are recorded on the film 118. At a next step E221, when the film detecting circuit 114 and the photo-sensor 115 detect that the film 118 has been moved by one frame portion thereof to reach a predetermined position, the film transport circuit 116 is caused to bring the film transporting motor 17 to a stop. After that, the flow comes back to the step E101 to wait for a next release.

By the steps described above, information relative to a series scene can be recorded on the film 118 in the same manner as shown in FIG. 11.

After photographing in the above-stated manner, When the film 118 is processed at a photofinishing laboratory, a signal indicative of a series scene is read and a printing process is carried out accordingly. In other words, since the series scene end signal is recorded at the photographing frames after the series scene start signal, as long as the frames have the series scene end signal, they are processed as the frames of the series scene. A plurality of consecutive frames of the series scene thus can be processed under the same condition.

Since the series scene mode is arranged to begin only in a case where the series scene end signal comes after the series scene start signal, the series scene mode is not allowed to take place when the switch SS-SW is turned off after single-shot photographing is performed with the switch SS-SW turned on.

With an operation switch, i.e., the switch SS-SW, arranged to enable the camera operator to set a series scene to be printed under the same condition, this embodiment enables the camera operator to obtain such photographs under the same condition, by performing a photography with the switch SS-SW turned on.

Further, while the switch SS-SW is connected to the microcomputer 101 in the fourth embodiment, this method of the embodiment may be replaced with another method of deciding to select or not to select the series scene mode by detecting the visual line of the operator looking into the viewfinder of the camera and by finding whether or not the operator is looking at a series scene mark displayed within the viewfinder.

(Fifth Embodiment)

Figure 13:
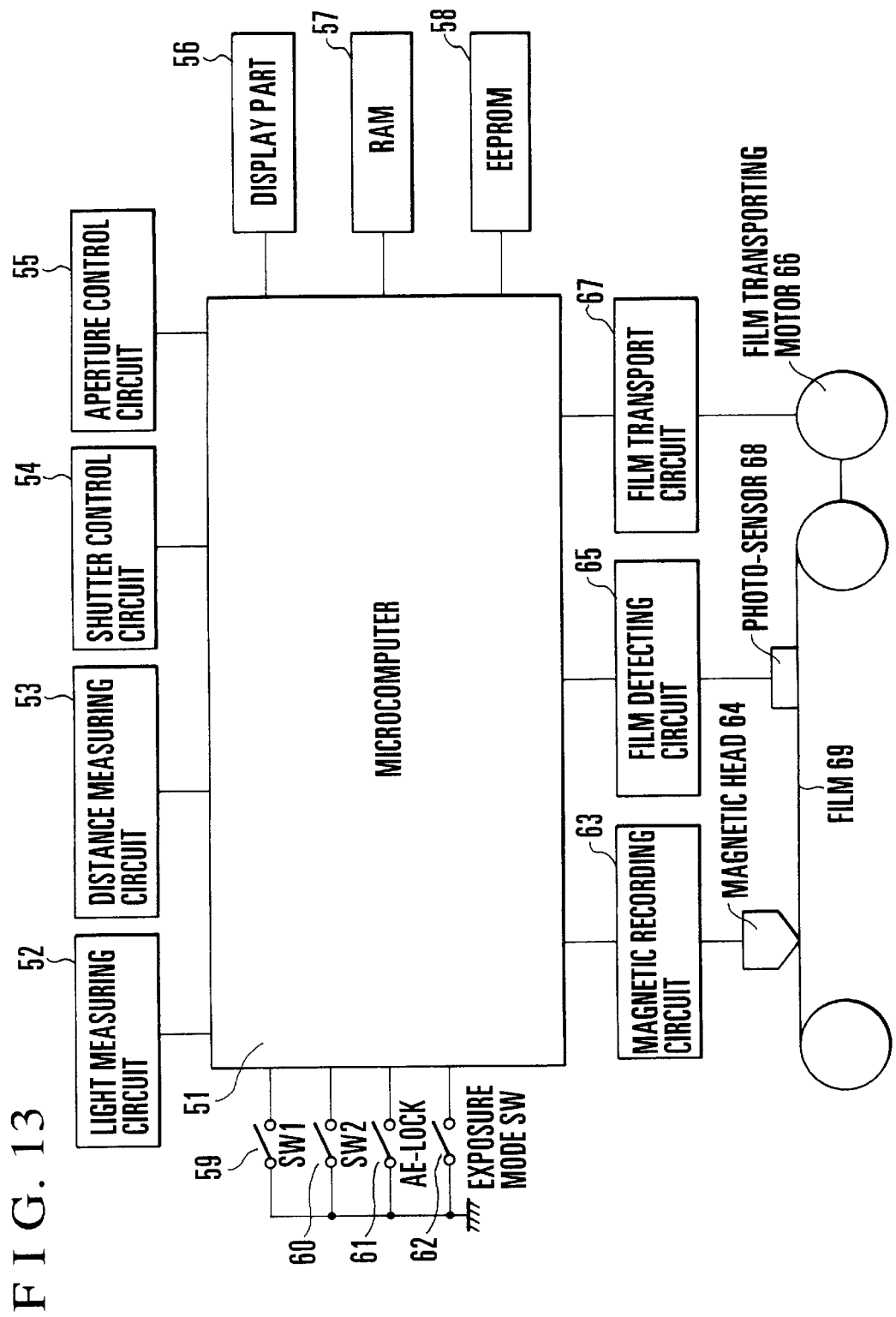
FIG. 13 is a block diagram showing the arrangement of circuits of a camera capable of magnetic recording which is arranged as a fifth embodiment of the invention.

FIG. 13 is a block diagram showing the circuit arrangement of a camera which uses a film of the kind having a magnetic recording part and is arranged as a fifth embodiment of the invention. The arrangement of each component parts is first described as follows.

Referring to FIG. 13, a microcomputer 51 is arranged to control the whole camera. A light measuring circuit 52 is arranged to measure the luminance of an object to be photographed. A distance measuring circuit 53 is arranged to detect a focus position for moving a photo-taking lens to the focus position. A shutter control circuit 54 is arranged to control the operation of a shutter for an exposure action. An aperture control circuit 55 is arranged to control the stopping-down amount of an aperture provided in the lens. A display part 56 is arranged to display information of varied kinds including a shutter speed, an aperture value, etc. When the camera is set in a series scene mode, the display part 56 makes a display indicating "series scene".

A RAM 57 is arranged to serve as an external storage means. An EEPROM 58 is arranged to serve as an external nonvolatile storage means. A light-and-distance measuring switch 59 (hereinafter referred to as a switch SW1) is provided for initiation of light and distance measuring actions. A release switch 60 (hereinafter referred to as a switch SW2) is provided for initiation of a shutter release action. An AE lock switch 61 (hereinafter referred to as a switch AE-LOCK) is provided for photographing with a measured light value fixed. An exposure mode switch 62 is provided for switching between a manual mode in which the operator can set an exposure value as desired and an AE mode in which an exposure value is automatically decided.

A magnetic recording circuit 63 is arranged to control a magnetic head 64 which is provided for writing photographing information on a film which has a magnetic recording part. A film detecting circuit 65 is arranged to detect a film transporting speed and a film position by controlling a photo-sensor 68. A film transport circuit 67 is arranged to control a film transporting motor 66 for transporting the film. The film 69 is provided with the magnetic recording part as mentioned above.

Figure 14:
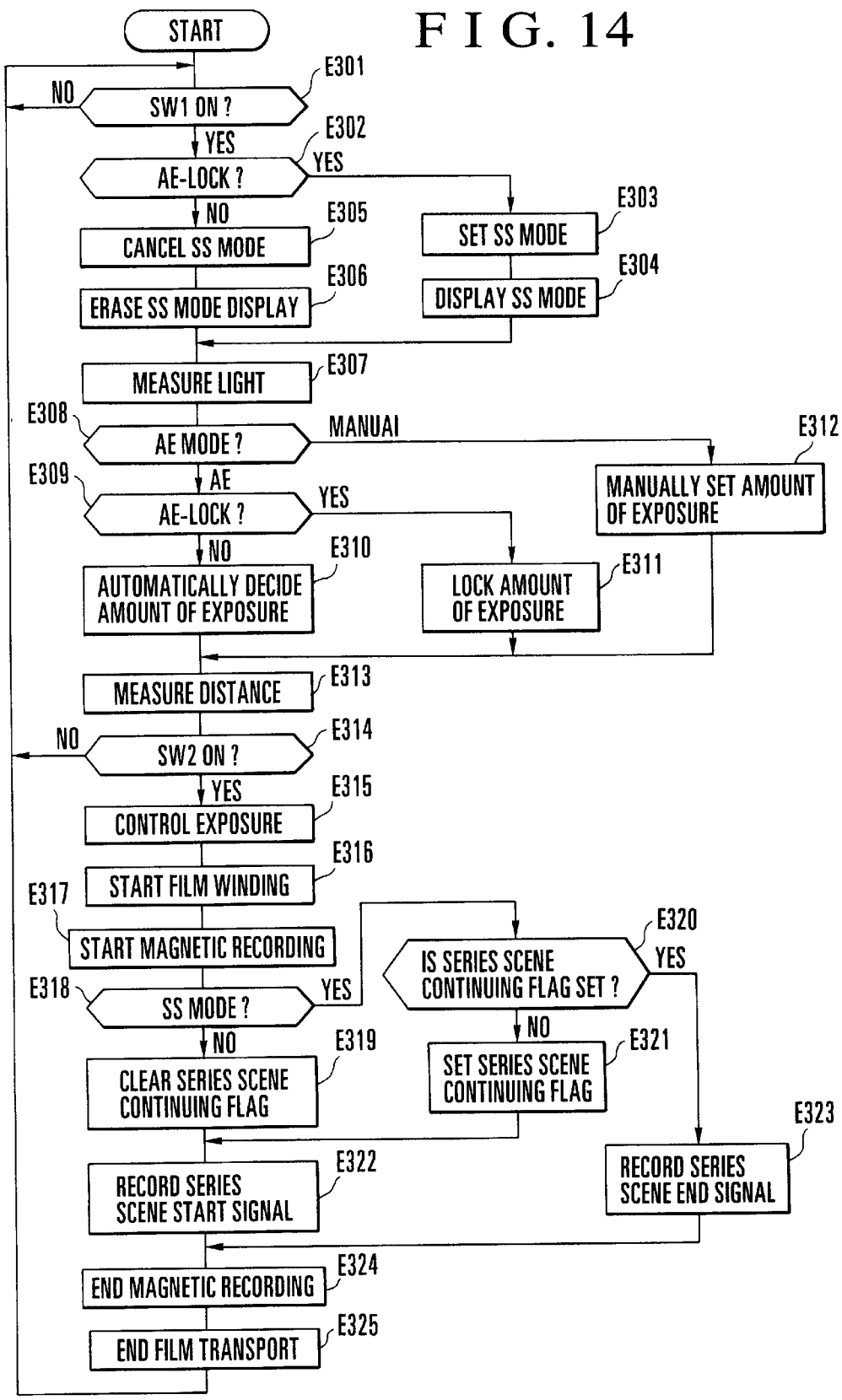
FIG. 14 is a flow chart showing an operation of the camera capable of magnetic recording arranged as the fifth embodiment of the invention.

FIG. 14 is a flow chart showing an operation of the microcomputer 51 shown in FIG. 13. The actions of the whole camera are described using this flow chart. When a main switch which is not shown is turned on, the microcomputer 51 begins to operate from a step E301.

At the step E301, a check is made to find if the switch SW1 is in an on-state. If not, the flow of operation waits for turning-on of the switch SW1. If so, the flow comes to a step E302 for initiation of various actions including light and distance measuring actions.

At the step E302, a check is made to find if the switch AE-LOCK is in an on-state. If so, the flow comes to a step E303. At the step E303, a flag within the RAM 57 is set in a series scene mode indicating state. At a next step E304, the display part 56 is caused to make a display showing that the camera is in the series scene mode. The flow then comes to a step E307.

If the switch AE-LOCK is found not to be in an on-state at the step E302, the flow comes to a step E305. At the step E305, the flag within the RAM 57 is released from the state of indicating the series scene mode. At a next step E306, the display showing "series scene mode" at the display part 56 is erased and the flow comes to the step E307.

Through these steps described above, the series scene mode is set and displayed if the switch AE-LOCK is in an on-state. The series scene mode is canceled and the display of the series scene mode is erased if the switch AE-LOCK is not in an on-state.

At the step E307, the light measuring circuit 52 is caused to measure the quantity of light of an object to be photographed for deciding a correct exposure value. The flow then proceeds to a step E308.

At the step E308, a check is made for the state of the exposure mode switch 62. If the state of the exposure mode switch 62 indicates the AE mode, the flow comes to a step E309. At the step E309, a check is made to find if the switch AE-LOCK is in an on-state. If so, i.e., if the camera is in the AE lock mode, the flow comes to a step E311. At the step E311, for photographing in the AE locked mode, a shutter speed and an aperture value to be controlled by a locked amount of exposure are decided. The flow then comes to a step E313. Further, if the switch AE-LOCK is found to be in an off-state, the flow comes from the step E309 to a step E310. At the step E310, an apposite amount of exposure is computed on the basis of a measured value of light obtained at the step E307. The flow then comes to a step E313.

Further, if the result of the check made at the step E308 indicates the manual mode, the flow comes to a step E312. At the step E312, a shutter speed and an aperture value to be controlled according to the values desired by the operator are set. The flow then comes to the step E313.

At the step E313, the distance measuring circuit 53 is caused to measure a distance to the object. The lens which is not shown is moved to focus the lens on the object and the flow comes to a step E314. At the step E314, a check is made to find if the switch SW2 is in an on-state. If not, the flow comes back to the step E301.

If the switch SW2 is found to be in an on-state, the flow comes from the step E314 to a step E315. At the step E315, the aperture control circuit 55 is first actuated to stop down the aperture of the lens to a position of the aperture value decided at the step E310, E311 or E312. After that, an exposure action is carried out by actuating the shutter control circuit 54 to operate the shutter at the shutter speed decided at the step E310, E311 or E312. The exposure action is terminated by causing the aperture control circuit 55 to bring the aperture back to its full open position. The flow then comes to a step E316.

At the step E316. the film transporting motor 66 is actuated to begin a winding action on the film 69. At a step E317, the magnetic head 64 is caused through the magnetic recording circuit 63 to begin recording photographing data such as a date, etc., in the magnetic recording part of the film 69. The flow then comes to a step E318.

At the step E318, a check is made for a series scene mode flag within the RAM 57. If no flag is set for the series scene mode, the flow comes to a step E319. At the step E319, since the camera is not in the series scene mode, if a series scene continuing flag is set at the RAM 57, the series scene continuing flag is cleared and the flow comes to a step E322.

In a case where the series scene mode flag is found inside of the RAM 57 at the step E318, the flow comes to a step E320. At the step E320, a check is made to find if the series scene continuing flag is set inside of the RAM 57. If not, the flow comes to a step E321 to set the series scene continuing flag at the RAM 57. The flow then comes to a step E322.

At the step E322, a series scene start signal is recorded in the magnetic recording part of the film 69. The step E322 is executed when the camera is not in the series scene mode and also when a shot is first taken after the series scene mode is set.

If the series scene continuing flag is found at the step E320, the flow comes to a step E323. At the step E323, a series scene end signal is recorded in the magnetic recording part of the film 69. The step E323 is executed for the second shot after the series scene mode is set and shots following the second shot.

At a step E324, when the magnetic recording data to be recorded are completely recorded on the film 69, the magnetic recording action comes to an end and the flow comes to a step E325. At the step E325, when the film detecting circuit 65 and the photo-sensor 68 detect that the film 69 has been moved as much as its one frame portion to reach a predetermined position, a release action is terminated by causing the film transport circuit 67 to bring the film transporting motor 66 to a stop. The flow then comes back to the step E301 to wait for a next release.

With the embodiment arranged as described above, when shots are taken for a plurality of frames in the AE lock mode, the series scene start signal is recorded at the first photographing frame of the film 69. After that, the series scene end signal is recorded for each of other frames until the AE lock mode is canceled.

Since the series scene end signal is recorded after the series scene start signal, in the same manner as in the case of the fourth embodiment, the frames for which the series scene end signal is recorded are judged to be having a series scene. Therefore, the frames of series scene can be easily discriminated from other frames so as to have a plurality of such frames printed under the same condition without fail.

In other words, the embodiment enables the camera operator to set a series scene as desired by pushing the switch AE-LOCK. Then, a signal indicating that printing be performed under the same condition can be adequately recorded on the film without fail.

The advantageous effects of the fourth and fifth embodiments described above are recapitulated as follows.

In the fourth embodiment, the switch SS-SW is arranged as an operation member to enable the operator to set a series scene to be recorded. The operator thus can set shots of the series scene as desired. In taking such shots of the series scene that the operator wishes to be printed under the same condition, the operator can set the mode of recording a series scene by means of the operation member, so that photographs can be obtained as desired.

In the case of the fifth embodiment, the AE lock is applied and a series scene mode is set if the exposure mode is the AE mode when the switch AE-LOCK is pushed. In the event of the manual exposure mode, the operator can set the series scene mode without applying the AE lock. The fifth embodiment thus enables the operator to set a series scene as desired, so that the same advantageous effect can be attained as in the case of the fourth embodiment.

Further, it is possible to include the switch SS-SW of the fourth embodiment in the arrangement of the fifth embodiment, to insert an additional step of making a check for the state of the switch SS-SW, for example, in between the steps E317 and E318 of FIG. 14, and to arrange the flow of operation to proceed to the step E318 if the switch SS-SW is found to be in an on-state or to proceed to the step E319 if the switch SS-SW is in an off-state. This modification permits photographing in a manner closer to what is intended by the operator.

In other words, the advantage attainable by the modification is as follows. In a case where the camera is set beforehand for such photographs that are desired to be printed under the same condition, i.e., for shots taken in the AE lock mode in the case of the embodiment, magnetic recording is automatically performed to show this desire, so that photographs can be finished with exposures carried out as desired by the operator. However, in cases where shots of a series scene are desired in some different mode, such as taking shots in the automatic exposure bracketing mode or the like, the desire cannot be met as the camera is not set for it beforehand. Therefore, in such a case, it is hardly possible to obtain photographs through exposures as desired. However, the addition of the switch SS-SW, on the other hand, enables the camera to meet such a desire. The modification thus gives a highly advantageous camera.

(Sixth Embodiment)

Figure 15:
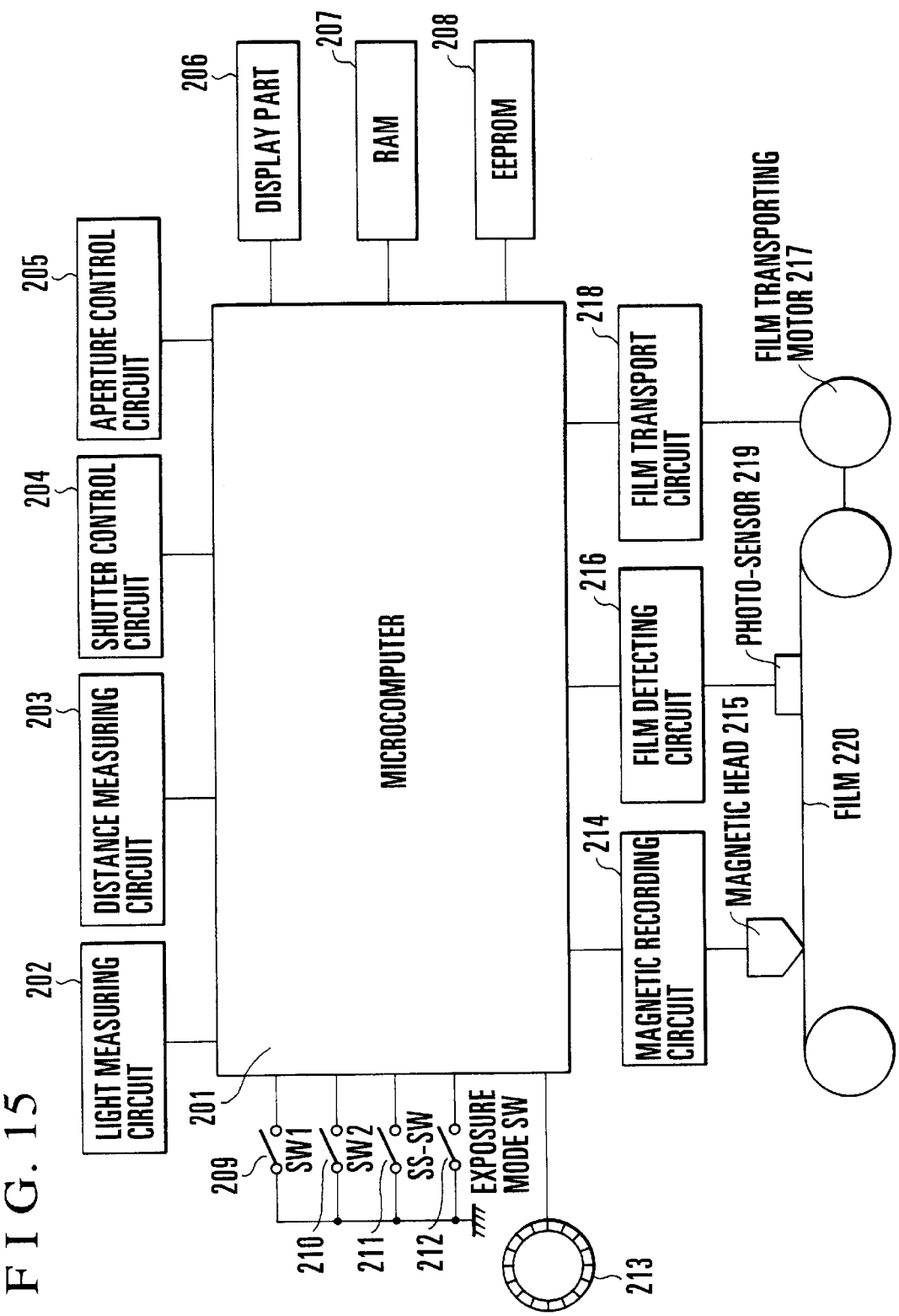
FIG. 15 is a block diagram showing the arrangement of circuits of a camera capable of magnetic recording which is arranged as a sixth embodiment of the invention.

FIG. 15 is a block diagram showing the circuit arrangement of a camera which uses a film of the kind having a magnetic recording part and arranged as a sixth embodiment of the invention. The arrangement of each part of the camera is first described as follows.

Referring to FIG. 15, a microcomputer 201 is arranged to control the whole camera. A light measuring circuit 202 is arranged to measure the luminance of an object to be photographed. A distance measuring circuit 203 is arranged to detect a focus position for moving a photo-taking lens to the focus position. A shutter control circuit 204 is arranged to control the operation of a shutter for an exposure action. An aperture control circuit 205 is arranged to control the stopping-down amount of an aperture provided in the lens. A display part 206 is arranged to display information of varied kinds including a shutter speed, an aperture value, the state of a film counter indicating a number of photographed frames of the film, etc. When the camera is set in a series scene mode, the display part 56 makes a display as "series scene".

A RAM 207 is arranged to serve as an external storage means. The RAM 207 includes a series scene flag which indicates a state of the series scene, a series scene continuing flag which indicates that a photographing operation on a series scene for a plurality of frames is still in process and a film counter which counts the number of photographed frames. An EEPROM 208 is arranged as an external non-volatile storage means to include flags indicating adjustment information of varied kinds, the states of the camera, etc., and to store also information of the RAM 207 as necessary. A light-and-distance measuring switch 209 (hereinafter referred to as a switch SW1) is provided for initiation of light measuring and distance measuring actions. A release switch 210 (hereinafter referred to as a switch SW2) is provided for initiation of a shutter release action. A setting switch 211 (hereinafter referred to as a switch SS-SW) is provided for enabling the operator of the camera to set a series scene mode. An exposure mode switch 212 is provided for switching from one exposure mode over to another.

A dial 213 is provided for effecting switch-over of the exposure mode by turning the dial 213 while keeping the above-stated exposure mode switch 212 in an on-state. A shutter priority AE mode, an aperture priority AE mode, a program AE mode, etc., can be switched from one over to another by operating the dial 213. Some operation mode of the camera other than the exposure mode also can be varied by turning the dial 213 while keep on pushing an applicable switch other than the exposure mode switch.

A magnetic recording circuit 214 is arranged to control a magnetic head 215 which is provided for writing photo-graphing information on the film which has a magnetic recording part. A film detecting circuit 216 is arranged to detect a film transporting speed and a film position from a signal coming from a photo-sensor 219. A film transport circuit 218 is arranged to control a film transporting motor 217 for transporting the film. The film 220 is provided with the magnetic recording part as mentioned above.

Figure 16:
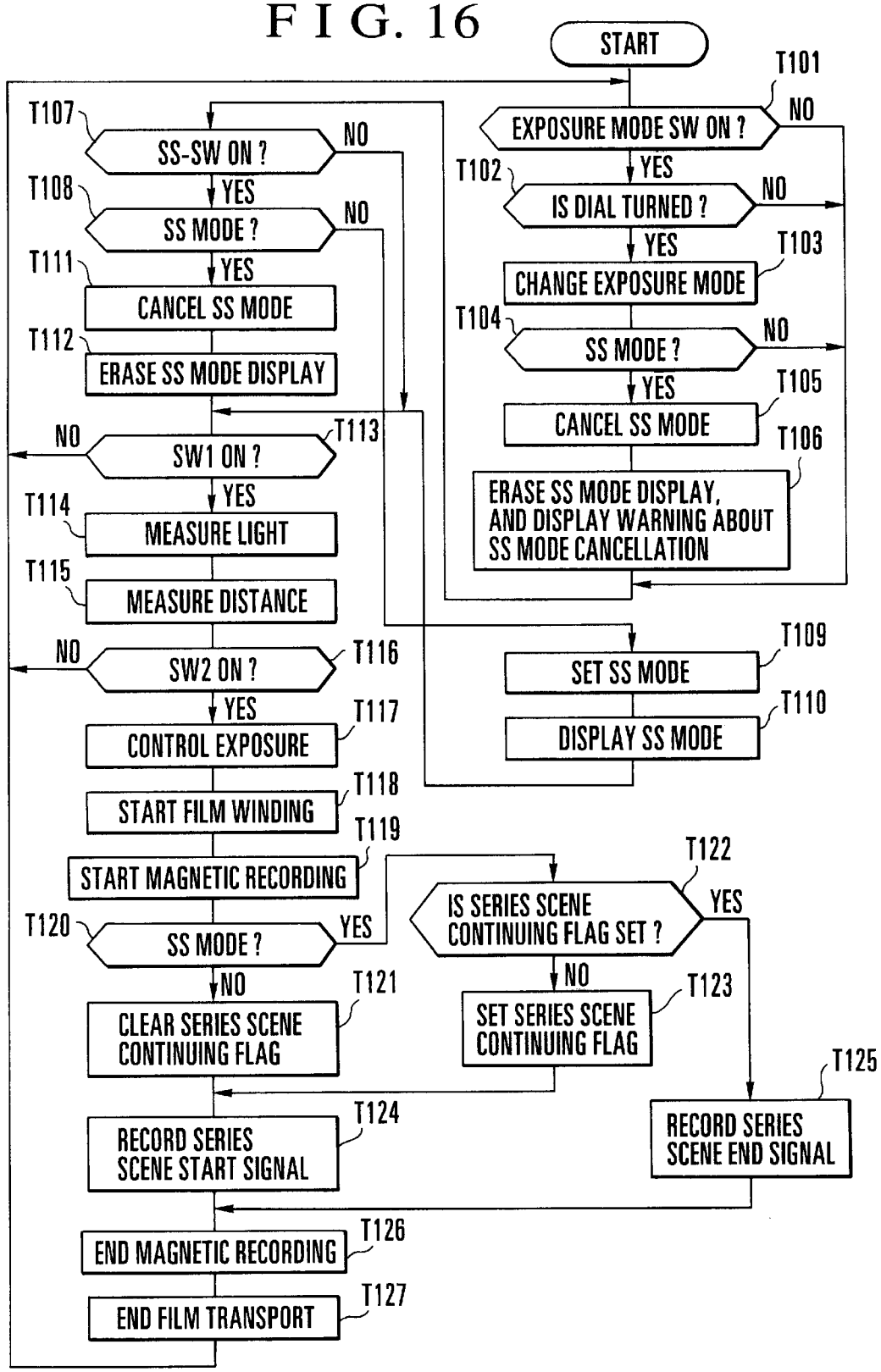
FIG. 16 is a flow chart showing an operation of the camera arranged as the sixth embodiment of the invention.

FIG. 16 is a flow chart showing an operation of the microcomputer 201 shown in FIG. 15. The actions of the whole camera are described using this flow chart.

When a main switch which is not shown is turned on, the microcomputer 201 begins to operate from a step T101. At the step T101, a check is made to find if the exposure mode switch 212 is in an on-state. If so, the flow of operation comes to a step T102. If not, the flow comes to a step T107.

At the step T102, since the exposure mode switch 212 is in an on-state, a check is made to find if the dial 213 is turned. If so, the flow comes to a step T103. If not, the flow comes to the step T107.

At the step T103, since the dial 213 is turned with the exposure mode switch 212 in an on-state, the exposure mode is changed according to the turning amount of the dial 213. The flow then comes to a step T104. At the step T104, a check is made for the flag of the RAM 207 to find if a series scene (SS) mode is set. If so, the flow comes to a step T105. If not, the flow comes to the step T107.

At the step T105, since the exposure mode is changed, the flag within the RAM 207 is released from the state of indicating the series scene mode, and the series scene continuing flag is cleared. At a next step T106, a "series scene" display which is made at the display part 206 is erased and is replaced with a display giving a warning that the series scene mode has been automatically canceled. The warning display may be made by some acoustic warning means such a buzzer.

At the step T107, a check is made to find if the switch SS-SW (the series scene setting switch 211) is in an on-state. If so, the flow comes to a step T108. If not, the flow comes to a step T113.

At the step T108, a check is made for the flag within the RAM 207 to find if the series scene mode is set. If not, the flow comes to a T109 to set the flag of the RAM 207 to show the series scene mode. After setting the series scene mode, the flow comes to a step T110 to cause the display part 206 to make the display of "series scene". The flow then comes to the step T113.

If the flag of the RAM 207 is found at the step T108 to indicate the series scene mode, the flow comes to a step T111. At the step T111, the flag within the RAM 207 is released from the state of indicating the series scene mode. At a step T112, the series scene display of the display part 206 is erased and the flow comes to the step T113.

The arrangement of the steps before the step T113 is recapitulated as follows. When the exposure mode is changed with the camera in the series scene mode, the series scene mode is automatically canceled and a warning is given. Then, the series scene mode can be set again when the switch SS-SW is set once again. In a normal case where the switch SS-SW is turned on while the camera is not in the series scene mode, there is obtained the series scene mode. The series scene mode is canceled when the switch SS-SW is turned on while the camera is in the series scene mode. The series scene mode thus can be set and canceled by operating the switch SS-SW. The switch SS-SW, i.e., the switch 211, is a push button switch which is arranged to be turned on every time it is pushed.

At the step T113, a check is made to find if the switch SW1 is in an on-state. If not, the flow comes back to the step T101 to make a check for the state of the switch SS-SW and waits for turning-on of the switch SW1.

If the switch SW1 is found at the step T113 to be in an on-state, the flow comes from the step T113 to a step T114 for the commencement of light and distance measuring actions. At the step T114, the light measuring circuit 202 is caused to measure the quantity of light of an object to be photographed for deciding a correct exposure value. The amount of exposure is decided accordingly. After that, an aperture value and a shutter speed are decided and the flow comes to a step T115. At the step T115, the distance measuring circuit 203 is caused to measure a distance to the object. A lens which is not shown is moved to focus the lens on the object and then the flow comes to a step T116.

At the step T116, a check is made to find if the switch SW2 is in an on-state. If not, the flow comes back to the step T101. If so, the flow comes to a step T117. At the step T117, the aperture control circuit 205 is first actuated to stop down the aperture of the lens to a position of the aperture value decided at the step T114. The shutter control circuit 204 is next actuated to perform an exposure action by operating the shutter at the shutter speed decided at the step T114. After that, the exposure action is terminated and the aperture control circuit 205 is again actuated to bring the aperture back to its full open position. The flow then comes to a step T118.

At the step T118, the film transporting motor 217 is actuated to perform a winding action on the film 220. At a step T119, the magnetic head 215 is caused through the magnetic recording circuit 214 to begin recording photographing data such as a date in the magnetic recording part of the film 220. The flow then comes to a step T120.

At the step T120, a check is made for the series scene mode flag of the RAM 207. If the flag does not indicate the series scene mode, the flow comes to a step T121. At the step T121, since the camera is not in the series scene mode, the series scene continuing flag is cleared if the flag is set within the RAM 207. The flow then comes to a step T124.

If the flag of the RAM 207 is found at the step T120 to indicate the series scene mode, the flow comes to a step T122. At the step T122, a check is made to find if the series scene continuing flag is set within the RAM 207. If not, the flow comes to a step T123 to set the series scene continuing flag within the RAM 207. The flow then comes to the step T124.

At the step T124, a series scene start signal is recorded in the magnetic recording part of the film 220. The step T124 is arranged to be executed when the camera is not in the series scene mode and also when a shot is taken for a photographing frame coming first after the series scene mode is set.

Further, if the series scene continuing flag is found at the step T122 to be set, the flow comes to a step T125. At the step T125, a series scene end signal is recorded in the magnetic recording part of the film 220. The step T125 is executed for a photographing frame coming second after the series scene mode is set and frames following the second frame.

At a step T126, all the magnetic recording data to be recorded are recorded. After completion of the data recording, the flow comes to a step T127. At the step T127, when the film 220 is detected by the film detecting circuit 216 and the photo-sensor 219 as to have been transported as much as one frame portion to reach a predetermined position, the film transport circuit 218 is caused to bring the film transporting motor 217 to a stop. A release action is thus comes to an end. The flow comes back to the step T101 to wait for a next release.

Figure 17:
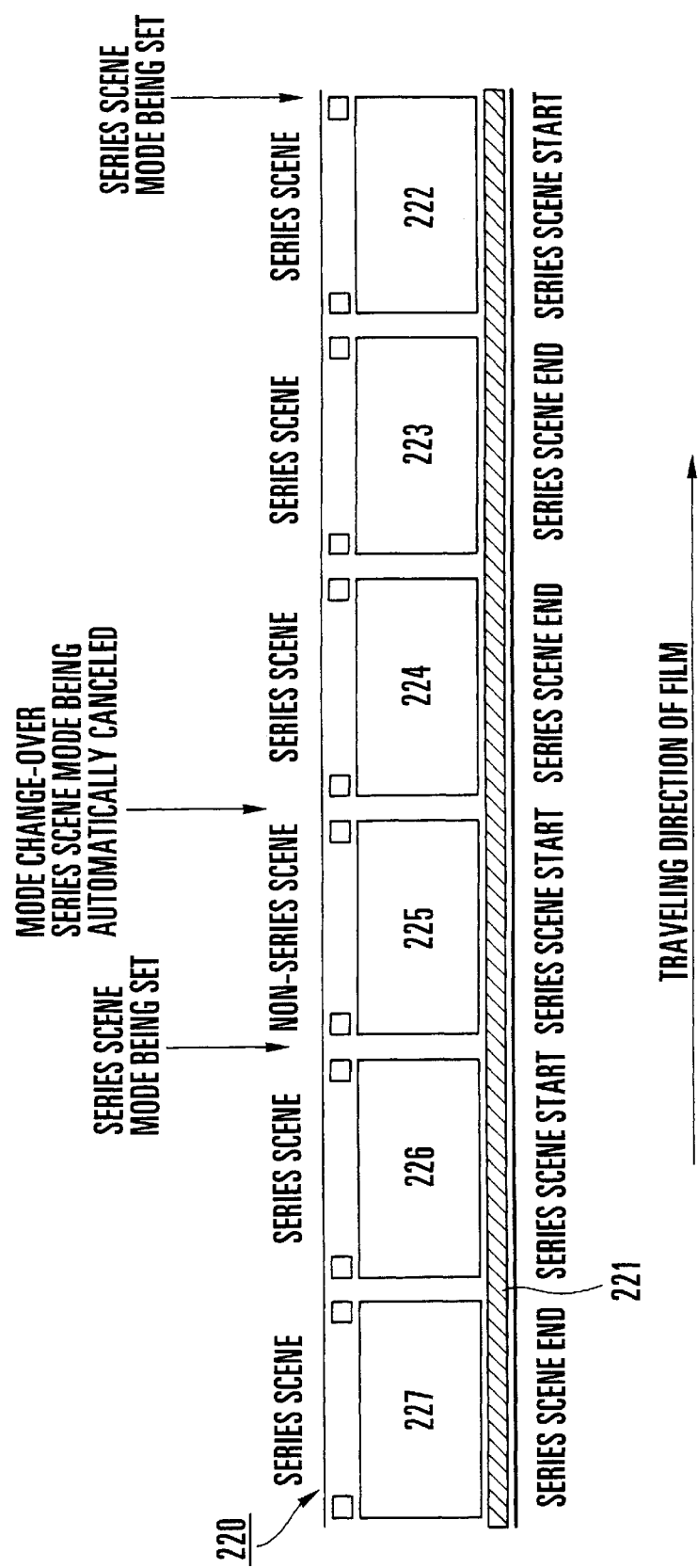
FIG. 17 shows how information relative to a series scene is recorded on a film when a series scene is photographed in the sixth embodiment of the invention.

FIG. 17 shows how information relative to a series scene is recorded on the film 220 in a case where shots are taken both in the series scene mode and in a non-series scene mode. This information is recorded in the magnetic recording part 221 of the film 220.

Referring to FIG. 17, the photographing frames of the film 220 are assumed to be serially exposed to light beginning with a photographing frame 222 disposed on the right end as viewed on the drawing.

A shot for the first photographing frame 222 is taken first after the series scene mode is set. As described above with reference to the flow chart of FIG. 16, the series scene start signal is recorded for the first photographing frame 222.

In a case where the exposure mode is changed, for example, from a program AE mode to an aperture priority AE mode by operating the exposure mode setting switch 212 and the dial 213 after a shot is taken for the photographing frame 224, the series scene mode is automatically canceled. Then, if a shot is taken for a next photographing frame 225 under this condition, since the series scene mode has been canceled by the change of the exposure mode, the shot becomes a non-series scene and the series scene start signal is recorded for the photographing frame 225 in the magnetic recording part 221 of the film 220, as described above with reference to the flow chart of FIG. 16.

After the shot is taken for the photographing frame 225, if the series scene mode is set by operating the switch SS-SW, the series scene start signal and the series scene end signal come to be recorded for subsequent photographing frames beginning with the photographing frame 226, in the same manner as the photographing frames 222 and 223.

When the film 220 is processed at a photofinishing laboratory after completion of photographing, a printing process is performed by reading the series scene indication signal recorded in the magnetic recording part 221 of the film 220. In that instance, with the series scene end signal recorded for the photographing frame which comes after the series scene start signal, the frames are judged to be a series scene as long as these frames consecutively have the records of the series scene end signal. Then, these frames are printed under the same condition.

The arrangement of the embodiment is such that the photographs are designated as a series scene only when the series scene end signal is recorded after the record of the series scene start signal. Therefore, if the series scene mode is canceled after taking a shot for one frame in the series scene mode, the frame is never processed as a series scene.

As described above, when the exposure mode is changed while the camera is set in the series scene mode, the series scene mode is automatically canceled with a warning. If the operator wishes to set the series scene mode again, the series scene mode can be set by just operating the switch SS-SW.

The embodiment is arranged to allow the change-over of the exposure mode by operating a switch and a dial in combination. However, the arrangement may be changed to effect the change-over, for example, by operating only a switch, by using a visual line input or by some other suitable method. The series scene mode also may be set by some suitable method other than the disclosed method of operating a switch.

(Seventh Embodiment)

Figure 18:
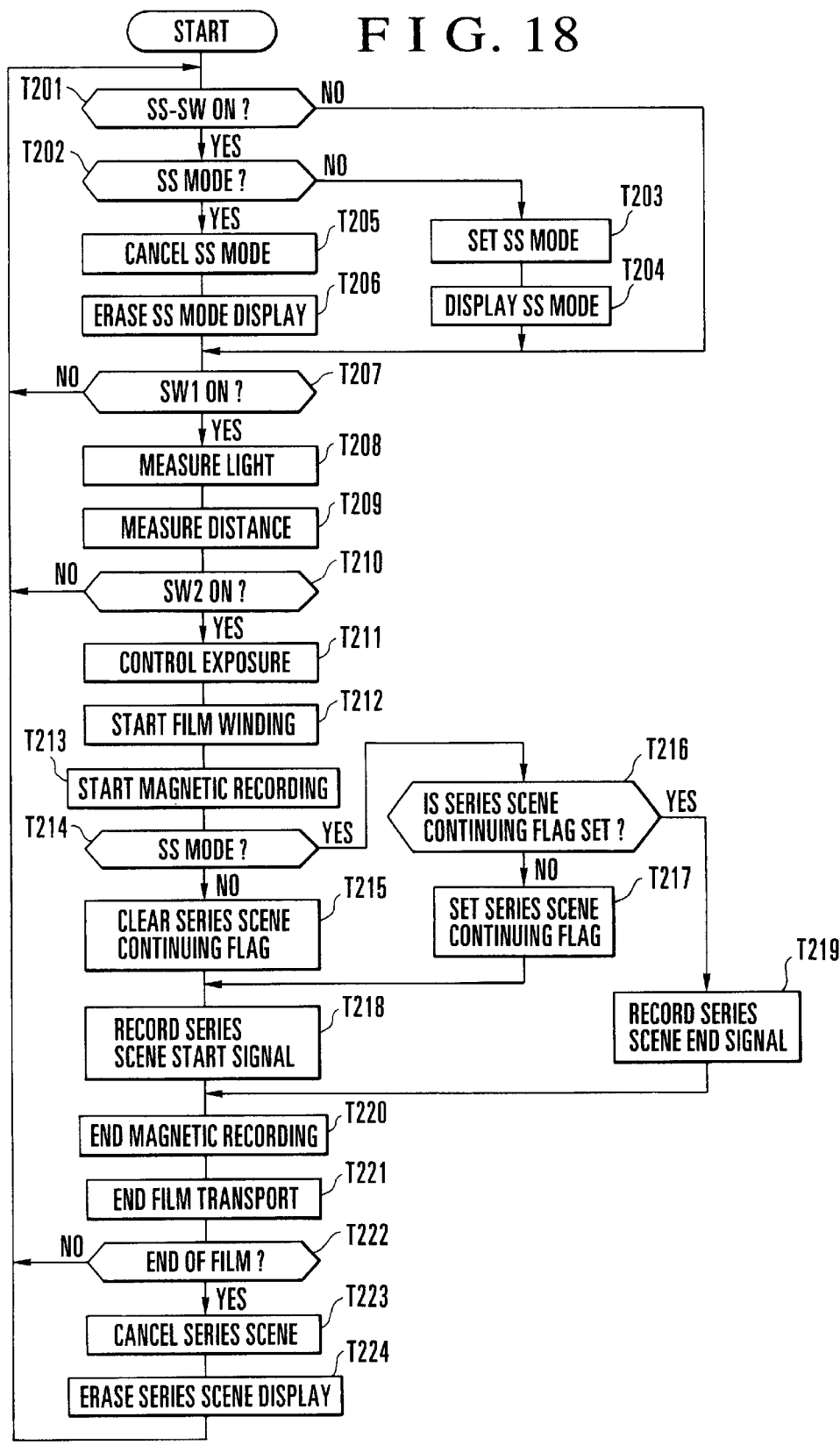
FIG. 18 is a flow chart showing an operation of a seventh embodiment of the invention.

FIG. 18 is a flow chart showing an operation of a microcomputer of a camera which is arranged to be capable of performing magnetic recording and arranged as a seventh embodiment of the invention. The circuit arrangement of the camera is the same as that of the sixth embodiment shown in FIG. 15 and is, therefore, omitted from the following description.

Referring to FIG. 18, the microcomputer 201 begins to operate from a step T201 when a main switch which is not shown is turned on.

At the step T201, a check is made to find if the switch SS-SW is in an on-state. If so, the flow of operation comes to a step T202. If not, the flow comes to a step T207.

At the step T202, a check is made for the state of a flag within the RAM 207. If the flag does not show the series scene mode, the flow comes to a step T203. At the step T203, the series scene mode is set by causing the flag within the RAM 207 to indicate the series scene mode. At a step T204, the display part 206 is caused to make a display of "series scene". The flow then comes to the step T207.

If the series scene mode is found at the step T202, the flow comes to a step T205. At the step T205, the flag within the RAM 207 is released from the state of indicating the series scene mode. At a next step T206, the display "series scene" of the display part 206 is erased. The flow then comes to the step T207.

The operation up to the above-stated part of the flow chart is recapitulated as follows. The series scene mode is obtained when the switch SS-SW is turned on while the camera is not in the series scene mode. The series scene mode is canceled when the switch SS-SW is turned on while the camera is in the series scene mode. The series scene mode is thus can be set and canceled both by operating the switch SS-SW.

At the step T207, a check is made to find if the switch SW1 is in an on-state. If not, the flow comes back to the step T201 to make a check for the state of the switch SS-SW and to wait till the switch SW1 turns on.

After that, when the switch SW1 turns on, the flow comes to a step T208 for the commencement of light and distance measuring actions. At the step T208, the light measuring circuit 202 is caused to measure the quantity of light of an object to be photographed. An amount of exposure is decided according to the measured quantity of light. Then, an aperture value and a shutter speed are decided and the flow comes to a step T209.

At the step T209, the distance measuring circuit 203 is caused to measure a distance to the object. Then, a lens which is not shown is moved to focus the lens on the object and the flow comes to a step T210.

At the step T210, a check is made to find if the switch SW2 is in an on-state. If not, the flow comes back to the step T201. If so, the flow comes to a step T211 for an exposure action. At the step T211, the aperture control circuit 205 is first actuated to stop down the aperture of the lens to a position of the aperture value decided at the step T208. The exposure action is carried out by actuating the shutter control circuit 204 to control and operate the shutter at the shutter speed decided at the step T208. The exposure action is terminated by actuating the aperture control circuit 205 to bring the aperture back to its full open position. The flow then comes to a step T212.

At the step T212, the film transporting motor 217 is caused to begin winding the film 220. At a step T213, the magnetic head 215 is caused through the magnetic recording circuit 214 to begin recording photographing data such as a date, etc., in the magnetic recording part of the film 220. The flow then comes to a step T214.

At the step T214, a check is made for the series scene mode flag of the RAM 207. If there is no flag indicating the series scene mode, the flow comes to a step T215. At the step T215, since the camera is not in the series scene mode, the series scene continuing flag is cleared if the flag is set within the RAM 207. The flow then comes to a step T218.

If the flag of the RAM 207 is found at the step T214 to indicate the series scene mode, the flow comes to a step T216. At the step T216, a check is made to find if the series scene continuing flag is set within the RAM 207. If not, the flow comes to a step T217 to set the series scene continuing flag within the RAM 207. The flow them comes to the step T218.

At the step T218, a series scene start signal is recorded in the magnetic recording part of the film 220. The step T218 is arranged to be executed when the camera is not in the series scene mode and also when a shot is taken for a photographing frame coming first after the series scene mode is set.

Further, if the series scene continuing flag is found at the step T216 to be set, the flow comes to a step T219. At the step T219, a series scene end signal is recorded in the magnetic recording part of the film 220. The step T219 is executed for a photographing frame coming second after the series scene mode is set and frames following the second frame.

At a next step T220, all the magnetic recording data to be recorded are recorded. After completion of the recording, the flow comes to a step T221. At the step T221, when the film is detected by the film detecting circuit 216 and the photo-sensor 219 as to have been transported as much as one frame portion to reach a predetermined position, the film transport circuit 218 is caused to bring the film transporting motor 217 to a stop. The count value of the film counter disposed within the RAM 207 is incremented by one. A displayed value of the film counter at the display part 206 is also incremented by one. The flow then comes to a step T222.

At the step T222, a check is made for the end of the film by checking the count value of the film counter of the RAM 207 to find if it has reached the number of photographable frames of the film detected by a number-of-photographable frames detecting means which is not shown. If the film has not reached its end as yet, the flow comes back to the step T201 to wait for a next shutter release.

If the film is found at the step T222 to have reached its end, the flow comes to a step T223 to release the series scene mode flag of the RAM 207 from the state of indicating the series scene mode. At the same time, the series scene continuing flag is cleared. At a step T224, the "series scene" display at the display part 206 is erased. The flow then comes back to the step T201 to terminate a shutter release action. The camera may be arranged to automatically inform the operator, at this step, that the series scene mode is canceled either by a display at the display part 206 or by a warning with a buzzer or the like.

As apparent from the description given above, the embodiment described is arranged to automatically cancel the series scene mode when the film reaches its end while the camera is still in the series scene mode.

While the embodiment automatically cancels the series scene mode when the film reaches its end, this arrangement may be changed to cancel the series scene mode when the film is taken out or when the camera is loaded with the film. It is also possible to arrange the series scene mode to be canceled not only when the film reaches its end but also even when the film is taken out halfway before the film reaches its end.

Further, while the camera is arranged according to the invention to automatically cancel the series scene mode at the end of the film and also in replacing the film, the camera may be arranged to automatically cancel the series scene mode and give a warning also when the camera is locked by means of a switch to inhibit a shutter release, when a light measuring switch is turned off, or when a continuous light measuring action is terminated.

Further, in accordance with the invention, the camera is arranged as described above to automatically cancel the series scene mode when it is preferable to automatically cancel it. However, it is possible to arrange the camera to let the operator decide whether or not the series scene mode is to be canceled.

(Eighth Embodiment)

Figure 19:
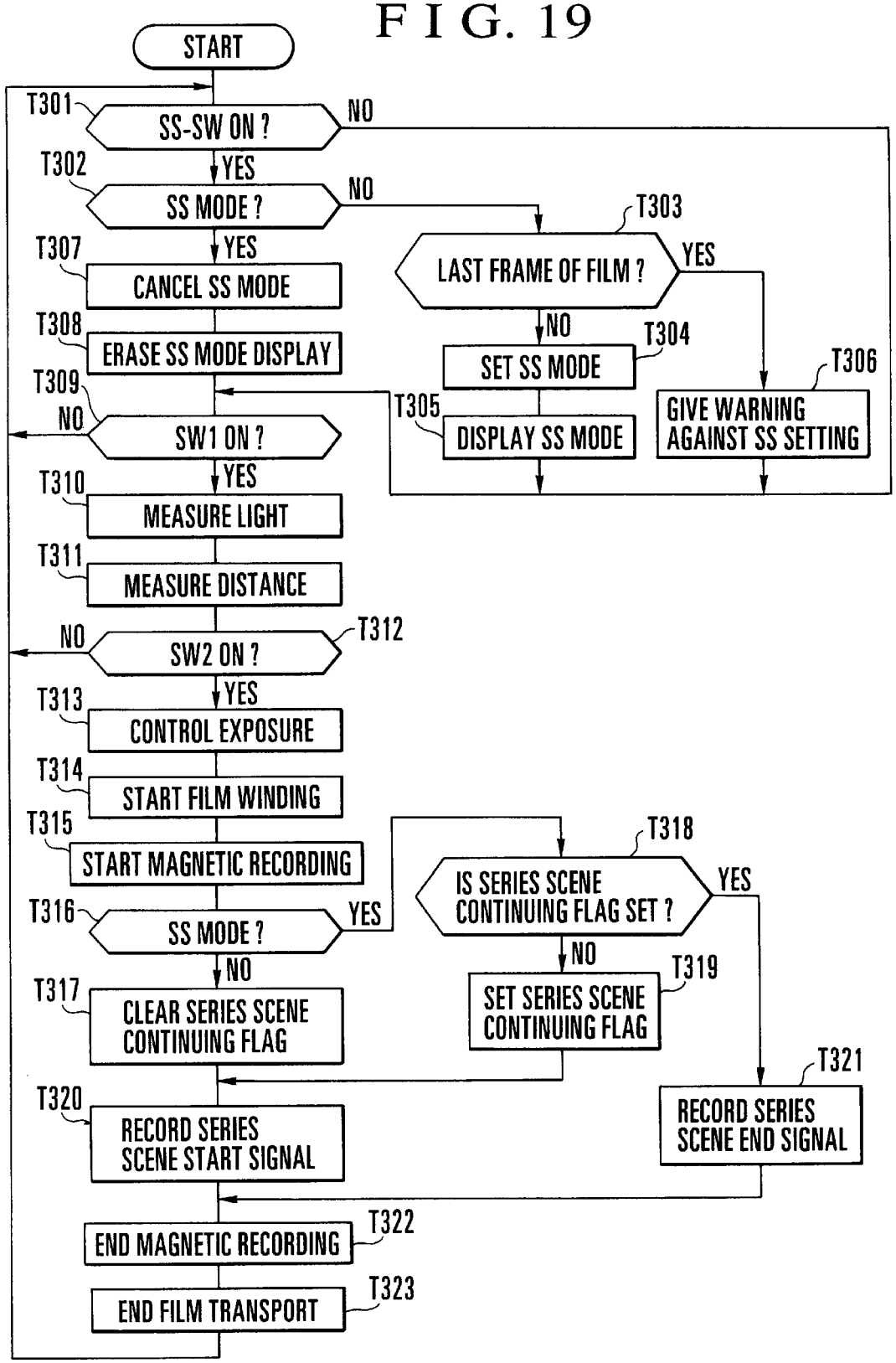
FIG. 19 is a flow chart showing an operation of an eighth embodiment of the invention

FIG. 19 is a flow chart showing an operation of a microcomputer of a camera which is capable of performing magnetic recording and arranged as an eighth embodiment of the invention. The circuit arrangement of the camera is the same as that of the sixth embodiment shown in FIG. 15 and is, therefore, omitted from description below.

Referring to FIG. 19, the microcomputer 201 begins to operate from a step T301 when a main switch which is not shown is turned on.

At the step T301, a check is made to find if the switch SS-SW is in an on-state. If so, the flow of operation comes to a step T302. If not, the flow comes to a step T309.

At the step T302, a check is made for the state of a flag obtained inside of the RAM 207 to find if the flag indicates the series scene mode. If so, the flow of operation comes to a step T307. At the step T307, the flag within the RAM 207 is released from the switch SS-SW. The flow then comes to a step T308.

If the series scene mode is found at the step T302 not to be set, the flow comes to a step T303. At the step T303, a check is made for the last frame of the film by checking the count value of the film counter of the RAM 207 to find if it has reached the number of photographable frames of the film detected by a number-of-photographable frames detecting means which is not shown. If the film is found to have reached the last frame, the flow comes to a step T306. In this instance, any attempt to set the series scene mode by operating the switch SS-SW with the camera not set in the series scene mode is not allowable as the position of the film has already reached the last frame. At the step T306, therefore, the display part 206 is caused to display an inhibiting warning against the setting of the series scene mode. The flow then comes to a step T309.

If the film is found at the step T303 not to be at the last frame, the flow comes to a step T304. At the step T304, the series scene mode is set by causing the flag of the RAM 207 to indicate the series scene mode. At a next step T305, a "series scene" display is made at the display part 206 and the flow comes to the step T309.

Actions described up to this part of the flow of operation are recapitulated as follows. When the switch SS-SW is turned on while the camera is not in the series scene mode and the film position is not the last frame, the series scene mode takes place. When the switch SS-SW is turned on while the camera is in the series scene mode, the series scene mode is canceled. The series scene mode can be set and canceled both by operating the switch SS-SW.

At the step T309, a check is made to find if the switch SW1 is in an on-state. If not, the flow comes back to the step T301 to make a check for the state of the switch SS-SW and waits till the switch SW1 is turned on.

If the switch SW1 is found in an on-state at the step T309, the flow comes to a step T310 for deciding a correct exposure value. At the step T310, the light measuring circuit 202 is caused to measure the quantity of light of an object to be photographed. An amount of exposure is decided according to the light measured. After that, an aperture value and a shutter speed are decided. At a step T311, the distance measuring circuit 203 is caused to measure a distance to the object. A lens which is not shown is moved to focus the lens on the object. The flow then comes to a step T312.

At the step T312, a check is made to find if the switch SW2 is in an on-state. If not, the flow comes back to the step T301. If so, the flow comes to a step T313 for an exposure action. At the step T313, the aperture control circuit 205 is actuated to stop down the aperture of the lens to a position of the aperture value decided at the step T310. The exposure action is next performed by actuating the shutter control circuit 204 to control and operate the shutter at the shutter speed decided at the step T310. The exposure action is terminated by causing the aperture control circuit 205 to bring the aperture back to its full open position. The flow then comes to a step T314.

At the step T314, the film transporting motor 217 is caused to wind the film 220. At a step T315, the magnetic recording circuit 214 is actuated to cause the magnetic head 215 to begin recording photographing data such as date, etc., in the magnetic recording part of the film 220. The flow then comes to a step T316.

At the step T316, a check is made for a series scene (SS) mode flag within the RAM 207. If no series scene mode flag is found, the flow comes to a step T317. At the step T317, if a series scene continuing flag is set within the RAM 207, the flag is cleared and the flow comes to a step T320.

If the series scene mode flag is found at the step T316, the flow comes to a step T318. At the step T318, a check is made to find if the series scene continuing flag is set within the RAM 207. If not, the flow comes to a step T319. At the step T319, the series scene continuing flag is set within the RAM 207. the flow then comes to a step T320.

At the step T320, a series scene start signal is recorded in the magnetic recording part of the film 220. The step T320 is arranged to be executed when the camera is not in the series scene mode and also for a shot taken first after the series scene mode is set.

If the series scene continuing flag is found at the step T318 to have been set, the flow comes to a step T321. At the step T321, the series scene end signal is recorded in the magnetic recording part of the film 220. The step T321 is arranged to be executed for the second shot taken after the series scene mode is set and for shots taken following the second shot.

At a step T322, when a magnetic recording action comes to an end with all the magnetic recording data to be recorded are recorded. The flow then comes to a step T323. At the step T323, when the film 220 is detected by the film detecting circuit 216 and the photo-sensor 219 as to have been transported as much as one frame portion to reach a predetermined position, the film transport circuit 218 is caused to bring the film transporting motor 217 to a stop. The count value of the film counter within the RAM 207 is incremented by one. A displayed count value of the film counter at the display part 206 is also incremented by one. The flow then comes to back to the step T310 to bring a series of release actions to an end.

As described above, in a case where an attempt is made to set the series scene mode at the last photographing frame of the film, the eighth embodiment prevents this attempt and gives an inhibiting warning against the series scene mode setting attempt. This arrangement may be changed to give only a warning indicating that it is meaningless to set the series scene mode.

(Ninth Embodiment)

Figure 20:
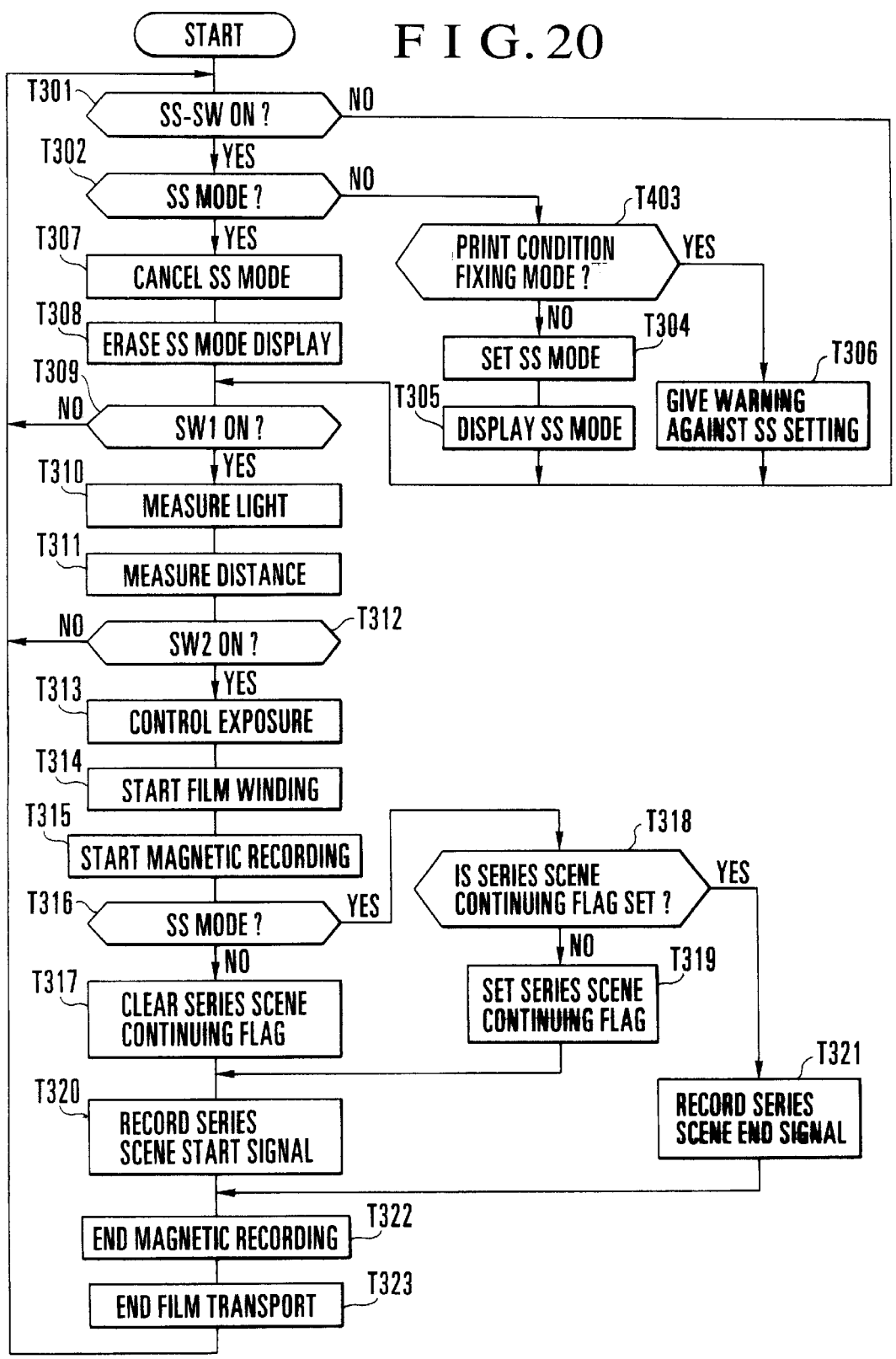
FIG. 20 is a flow chart showing an operation of a ninth embodiment of the invention.

FIG. 20 is a flow chart showing an operation of a microcomputer of a camera which is capable of performing magnetic recording and arranged as a ninth embodiment of the invention. The circuit arrangement of the camera is the same as that of the sixth embodiment shown in FIG. 15 and is, therefore, omitted from the following description.

The flow chart of FIG. 20 is almost the same as that of FIG. 19 which shows the operation of the eighth embodiment described above. Therefore, only a point (a step T403) where the ninth embodiment differs from the eighth embodiment is described as follows.

At the step T403 of FIG. 20, a check is made to find if the camera is set in a printing condition fixing mode in which an instruction is given to make a printing condition for a whole roll of film, including printing time, color correction, etc., constant. If so, the series scene mode is not set and an inhibiting warning against the setting of the series scene mode is given at a next step. If not, the series scene mode is set.

This arrangement may be changed, as mentioned in the foregoing description of the seventh embodiment, to set the series scene mode, with a simple warning, and to leave a choice between setting or not setting to the discretion of the operator.

Further, in another possible modification, if the camera is in the printing condition fixing mode, the series-scene-start and series-scene-end signals are not recorded. This modification leaves some margin in the recording capacity of the magnetic recording part for recording information of some other kind.

(Tenth Embodiment)

Figure 21:
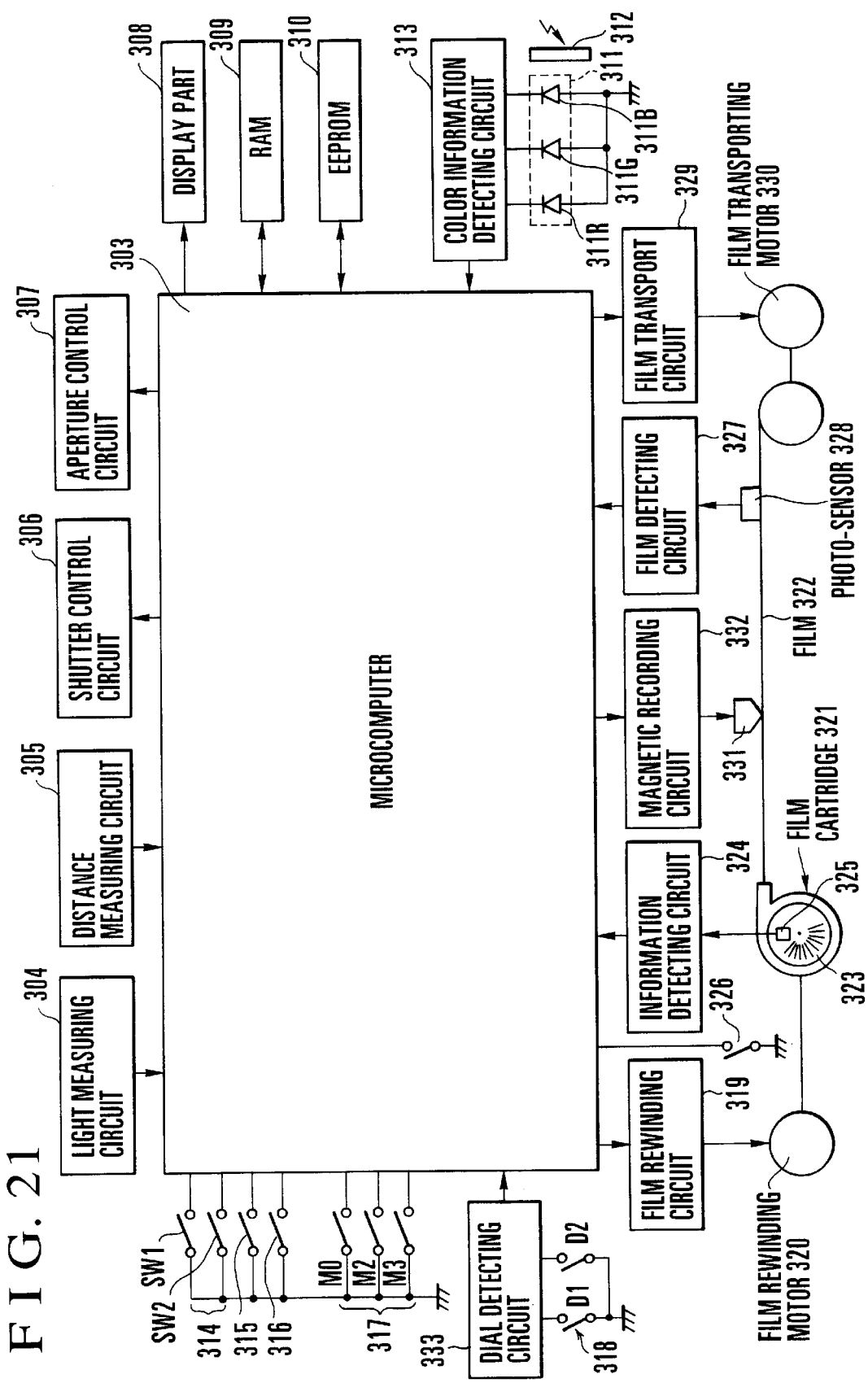
FIG. 21 is a block diagram showing the arrangement of a electrical system of a camera arranged according to the invention as a tenth embodiment thereof.
Figure 22:
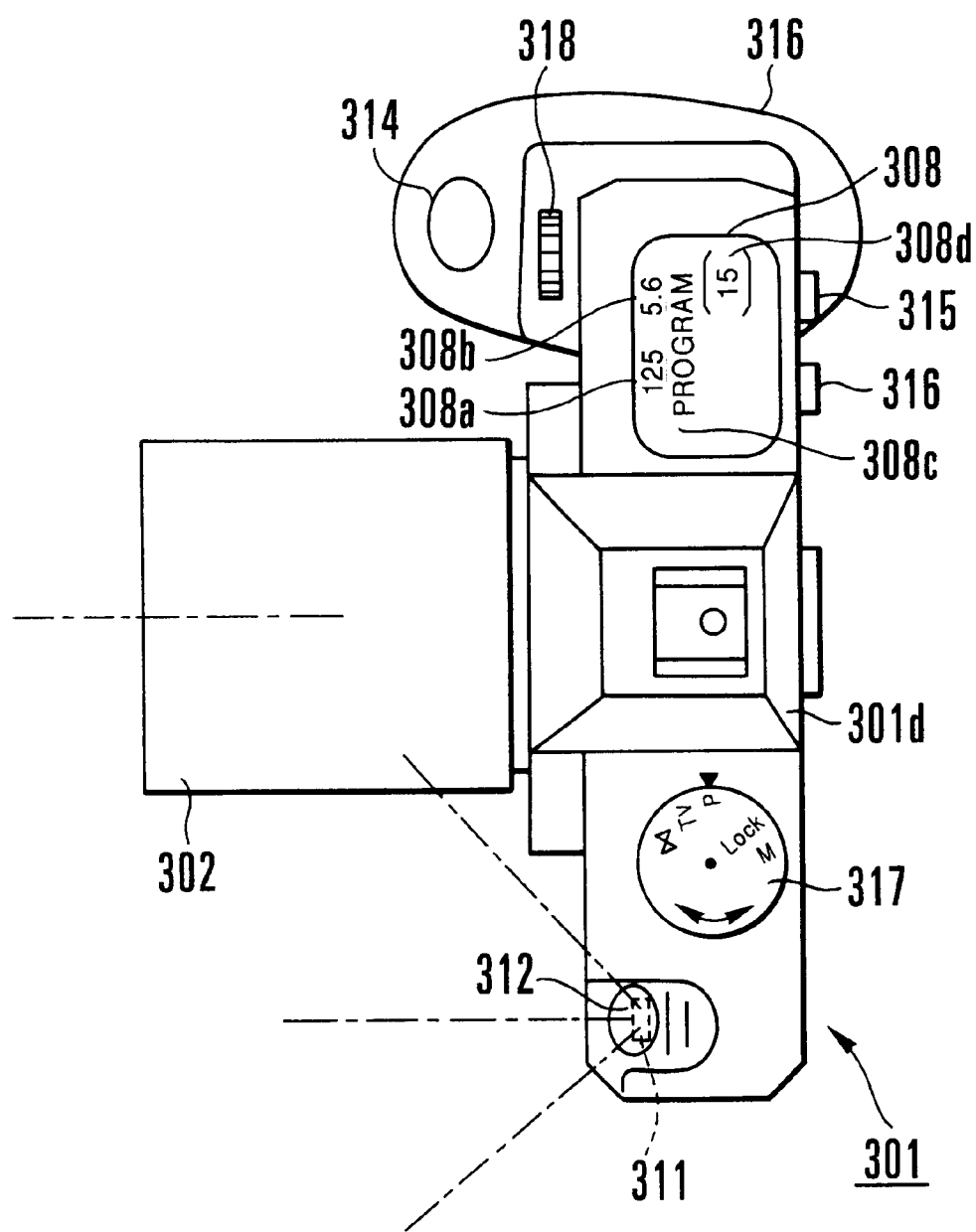
FIG. 22 is a plan view showing the appearance of the camera arranged as the tenth embodiment of the invention.
Figure 23:
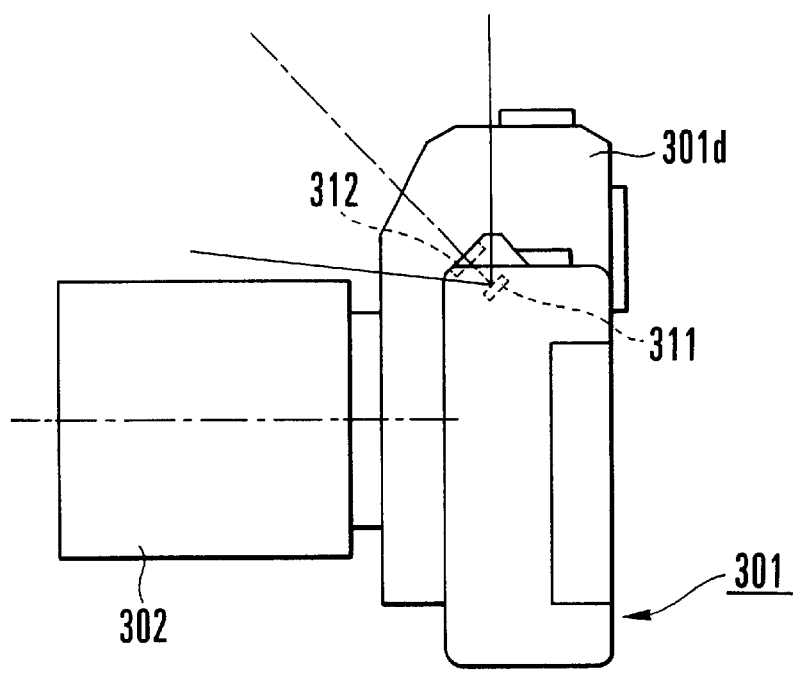
FIG. 23 is a side view of the camera of FIG. 22.

FIG. 21 is a block diagram showing the arrangement of an electric system of a camera which is arranged as a tenth embodiment of the invention. FIG. 22 is a plan view showing the appearance of the camera which is the tenth embodiment. FIG. 23 is a side view of the camera shown in FIG. 22.

The camera shown in FIGS. 22 and 23 is of a type called a single-lens reflex camera. The electric system shown in FIG. 21 is arranged inside of the camera together with related mechanisms. The camera 301 has a lens mount arranged approximately in the middle of the front side of the camera 301 for detachably mounting a photo-taking lens 302. A grip is arranged to include a battery chamber therein. A lid is arranged to be opened and closed in replacing a film. A viewfinder part 301d is arranged to permit viewing, through the photo-taking lens 302, the image of an object to be photographed. These parts are arranged in one unified body.

Referring to FIG. 21, the electric system is mainly composed of a microcomputer 303 which functions as a control device. To the microcomputer 303 are connected various parts which are arranged as follows. A light measuring circuit 304 is arranged to measure light for deciding an amount of exposure. A distance measuring circuit 305 is arranged to detect a focus position and to move the photo-taking lens 302 to the focus position. A shutter control circuit 306 is arranged to cause a shutter to open and close for an exposure action. The shutter is a focal plane shutter of an electronic control type and is disposed within the body of the camera 301. An aperture control circuit 307 is arranged to control the stopping down amount of the aperture of the lens 302. A display part 308 is arranged to display information of varied kinds such as a shutter speed, an aperture value, etc., on an LCD display device. A RAM 309 is arranged as an external storage means. An EEPROM 310 is arranged as a nonvolatile external storage means. A color measuring (colorimetric) sensor 311 is arranged as an RGB sensor.

As shown in FIG. 22, the display part 308 is an LCD (liquid crystal display) device and is disposed on one side of the upper surface of the camera 301. The display part 308 is arranged to display a shutter speed 308a, an aperture value 308b, an exposure mode 308c and a film frame number 308d in English letters and numerals.

The color measuring (RGB) sensor 311 is described in detail as follows. The RGB sensor 311 consists of three light receiving parts including a light receiving part 311R which has a sensitivity peak for red, a light receiving part 311G which has a sensitivity peak for green and a light receiving part 311B which has a sensitivity peak for blue. The RGB sensor 311 is arranged to detect color information on a photographing light coming through a white transmission plate 312. The white transmission plate 312 is arranged to eliminate any adverse effect of a partial polarized color by diffusing an incident photographing light. As shown in FIGS. 22 and 23, the RGB sensor 311 is arranged on the front (object side) of the camera 301 in such a position as to be capable of receiving light coming from above on a wide-angle side. Any adverse effect of a polarized color of the object can be eliminated by the arrangement. Further, since a light source used for illuminating an object to be photographed is located above the camera in many cases, the arrangement of the RGB sensor 311 makes detection of the color of the light source easier.

Figure 24:
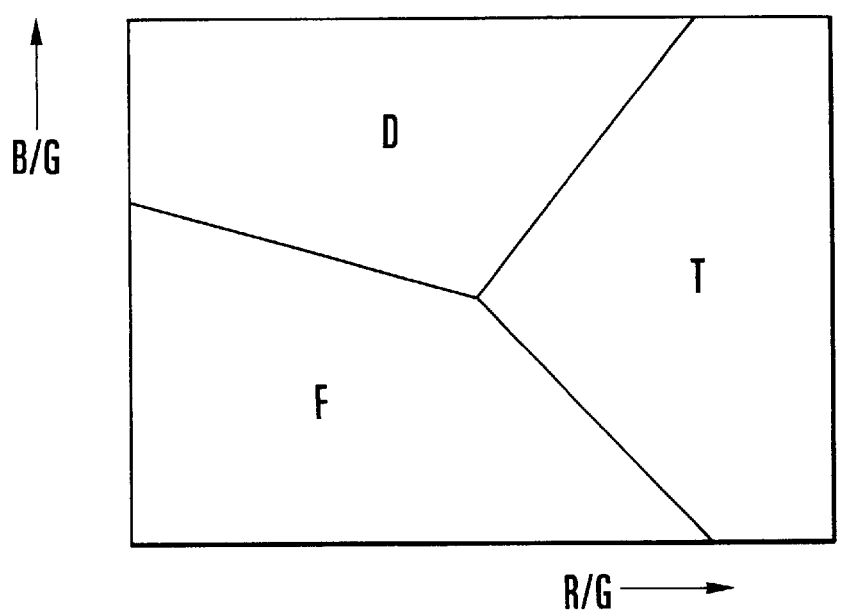
FIG. 24 is a regional map used in detecting the kind of a photographing light source according to the invention.

The spectral sensitivity of the light receiving part 311R is about 500 to 650 nm in the R region, about 450 to 600 nm in the G region and about 400 to 550 nm in the B region. The output of each of the light receiving parts is supplied through the color information detecting circuit 313 to the microcomputer 303 as R/G and B/G values on the basis of an output selection signal coming from the microcomputer 303. These values are stored in the RAM 309. In accordance with a regional map shown in FIG. 24, the microcomputer 303 judges the light obtained at the time of photographing to be the natural light of a D region, or a fluorescent lamp light of an F region or a tungsten lamp light of a T region according to the R/G value and the B/G value. The regional map is obtained through experiments beforehand and is stored in a ROM which is included in the microcomputer 303.

A release button 314, an AEB switch 315, an AE lock switch 316, a main dial 317, a setting dial 318, a film rewinding circuit 319 and a film rewinding motor 320 are connected to the microcomputer 303. The release button 314 is arranged such that the first stroke of it turns the switch SW1 on to initiate light, distance and color measuring actions and the second stroke of it turns the switch SW2 on to initiate an exposure action. The AEB switch 315 is arranged to be used in setting an AEB mode. In the AEB mode, shots are taken for a plurality of photographing frames by automatically varying an exposure according to the width of an exposure correcting amount.

The AE lock switch 316 is arranged such that an exposure value is decided on the basis of a measured value of light obtained when this switch 316 is pushed. The main dial 317 is provided with three switches M1, M2 and M3, which are arranged to permit detection of the rotating positions of the dial 317. In the case of this particular embodiment, any of four exposure modes can be selected by adjusting an indicator on the dial 317 to an index mark. More specifically, four different exposure modes including "aperture priority AE", "shutter priority AE", "program priority AE" and "manual setting exposure" mode positions and a lock position where the power supply of the camera 301 is turned off are provided at the dial 317.

The setting dial 318 is arranged to be used in setting information and is provided with two sliding contacts D1 and D2. These sliding contacts are arranged to swing relative to coding plates. The moving amounts of the sliding contacts relative to the coding plates are detected as digital signals. The sliding contacts D1 and D2 and the coding plates jointly form a known incremental rotary encoder. Assuming that the "aperture priority AE" mode is selected by the main dial 317, a setting value of aperture increases (for an over-exposure) by 0.5 step when the setting dial 318 is turned to the right to an extent of one click, for example, and decreases (for an under-exposure) by 0.5 step when the setting dial 318 is turned to the left to an extent of one click. In a case where the "shutter priority AE" mode is selected, the operation of the setting dial 318 likewise causes the setting value of shutter speed to vary. If the "program priority AE" mode is selected, the operation of the setting dial 318 causes both a shutter speed value and an aperture value to vary respectively by 0.25 step. If the "manual setting exposure" mode is selected, the operation of the setting dial 318 causes the setting value of shutter speed or that of aperture to vary. Further, the shifting extent (width) of the AEB mode can be set by turning the setting dial 318 while keeping the AEB switch 315 in an on-state.

The film rewinding circuit 319 controls the film rewinding motor 310 which is a drive source arranged to rotate the rewinding shaft of a film cartridge 321. The film rewinding circuit 319 is arranged such that, a film which has been used for photographing, i.e., an exposed film, is rewound back into the film cartridge 321 and, at the same time, a disk disposed on the film cartridge 321 to have a bar code 323 recorded thereon is rotated. A photo-reflector 325 is arranged above the disk to read the bar code 323. Further, the camera is provided with a switch 326 which is arranged to detect the film cartridge 321 when the camera is loaded with it. The switch 326 is turned on when the film cartridge 321 is loaded on the camera and its lid is closed. The film 322 is contained in the film cartridge 321, with data recorded on the disk, and is pulled out toward a take-up reel.

The microcomputer 303 is connected further to an information detecting circuit 324 arranged to read information recorded in the bar code 323, a film detecting circuit 327 arranged to detect the transporting speed and position of the film 322, a photo-sensor 328 which is provided for detecting the film transporting speed and the position of the film 322, a film transport circuit 329 which controls a film transporting motor 330 for transporting the film 322, and a dial detecting circuit 333 arranged to detect the operating states of the magnetic recording circuit 332 and the setting dial 318.

A magnetic head 331 which is provided for magnetically recording information on the film 322 is connected to the magnetic recording circuit 332. By the magnetic recording, information of varies kinds including a date, time, photographing data and the kind of an illumination light source, is recorded in a magnetic recording part provided on the film 322. The magnetic recording is carried out while the film 322 is in process of being transported to a next frame position after a shot is taken.

Figure 25:
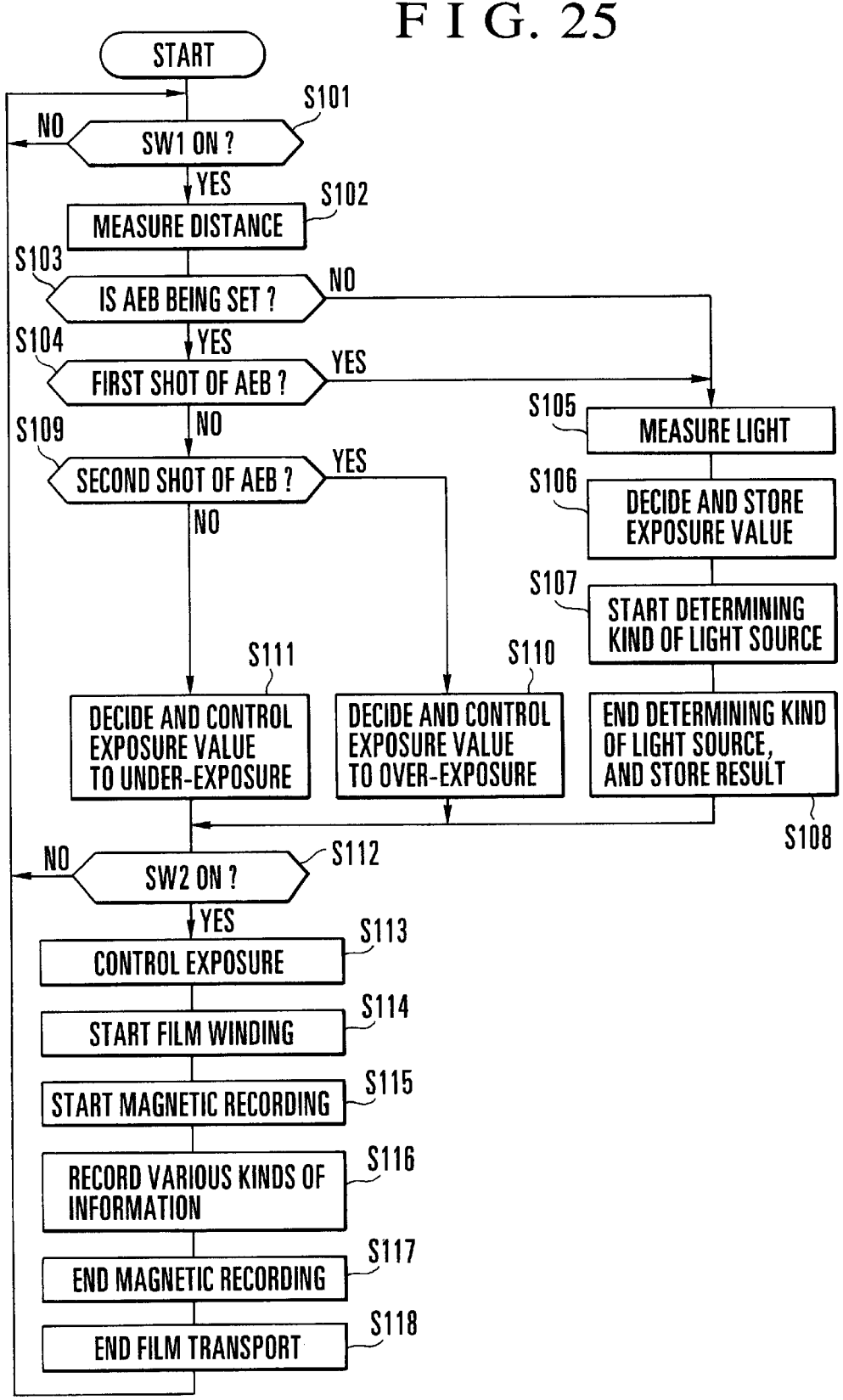
FIG. 25 is a flow chart showing a flow of processes to be executed by the camera arranged as the tenth embodiment of the invention.

FIG. 25 is a flow chart showing an operation of the camera which is the tenth embodiment.

Processes in the flow of operation are executed by the microcomputer 303. The flow begins when the main dial 317 of the camera 301 is turned on (unlocked). At a step S101, a check is made to find if the release button 314 is in an on-state in its first stroke position. If so, the flow comes to a step S102 for distance measuring. At the step S102, the distance measuring circuit 305 is actuated to perform a distance measuring action to detect a focus position for an object to be photographed and to bring the photo-taking lens 302 into an in-focus state. At a next step S103, a check is made to find if the photographing mode is set to the AEB mode. If so, the flow comes to a step S104, to find if the current frame is a first frame in the AEB mode. If the photographing mode is found not to be the AEB mode at the step S103, the flow comes to a step S105. At the step S105, the light measuring circuit 304 is caused to measure the light, i.e., the luminance, of the object. At a step S106, a correct exposure value is decided on the basis of the result of the light measuring action. Further, a shutter speed or an aperture value is decided according to the photographing mode set. In other words, a shutter speed is decided in the case of the aperture priority mode and an aperture value is decided if the mode is the shutter priority mode. The values thus decided are stored in the RAM 309. At a step S107, the kind of a light source which is illuminating the object is determined. At a step S108, the kind of the light source determined through the step S107 is stored in the RAM 309.

If the photographing frame is found at the step S104 not to be the first frame obtained in the AEB mode, the flow comes to a step S109. At the step S109, a check is made to find if the frame is a second frame in the AEB mode. If so, the flow comes to a step S110. At the step S110, a value obtained by shifting the exposure value decided and stored by the step S106 as much as the exposure shifting amount of the AEB is decided as an exposure value to be used this time. If the frame is found at the step S109 not to be the second frame in the AEB mode, it means that the frame is a third frame in the AEB mode. In this case, the flow comes to a step S111. At the step S111, the exposure value decided and stored at the step S106 is shifted as much as the exposure shifting amount on the side of under-exposure. A value thus obtained is decided as an exposure value to be used this time.

Upon completion of the process of any of the steps S108, S110 and S111, the flow comes to a step S112. At the step S112, a check is made to find if the release button 314 is in an on-state in its second stroke position. If so, the flow comes to a step S113. If not, the flow comes back to the step S101 to repeat the steps subsequent to the step S101. In other words, if the switch SW2 is in an off-state while the switch SW1 is in an on-state, the light and distance measuring actions are repeated before an exposure action and the flow waits for turning-on of the switch SW2. When the switch SW2 is turned on, the flow comes to a step S113. At the step S113, the aperture control circuit 307 is caused to stop down the aperture of the photo-taking lens 302 to a position of an aperture value decided through the steps S106 and S111 or S112. After that, the shutter control circuit 306 is actuated to carry out an exposure action by controlling and operating the shutter at the shutter speed decided through the steps S106 and S111 or S112. After that, the exposure action is terminated by causing the aperture control circuit 307 to bring the aperture back to its full open position.

At a step S115, the film transporting motor 330 is caused to perform a winding action on the film 322. At steps S116 and S117, the magnetic recording circuit 332 is actuated to cause the magnetic head 331 to record data, such as a date, a shutter speed, an aperture value, the kind of light source, etc., in the magnetic recording part of the film 322. At a step S118, upon completion of the magnetic recording, the film 322 is transported to an extent corresponding to one photographing frame. When the film is thus brought to a predetermined position, the film transporting motor 330 is brought to a stop to terminate a release action. The flow then comes back to the step S101 to repeat the steps described above.

Figure 26:
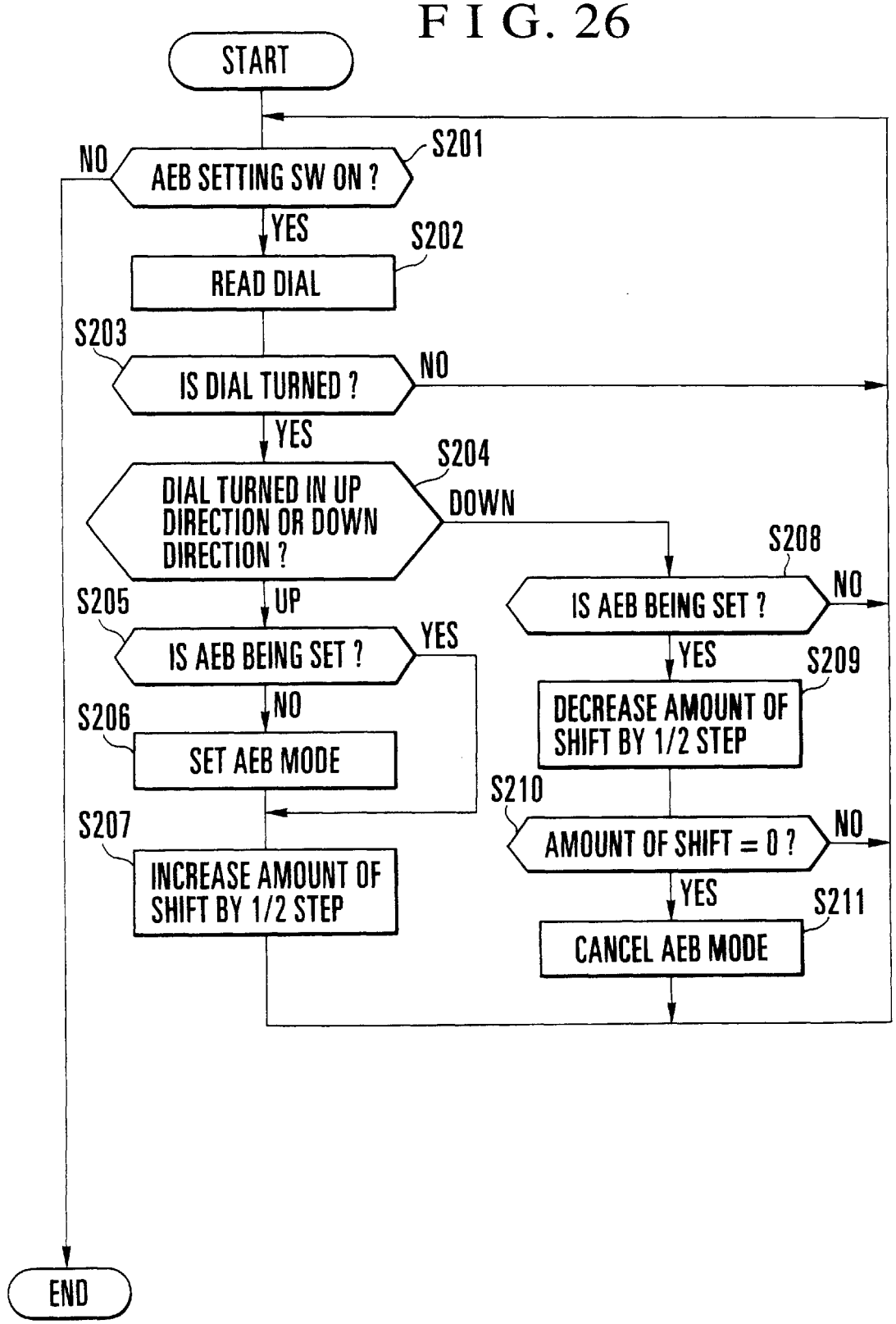
FIG. 26 is a flow chart showing a setting method for AEB.

A method for setting the AEB mode is described next with reference to FIG. 26. The process of setting the AEB mode is executed during a main routine which is not shown. FIG. 26 shows the details of the AEB setting process to be executed within the main routine.

Referring to FIG. 26, at a step S201, a check is made to find if the AEB switch 315 is in an on-state. If so, the flow of operation comes to a step S202 to read the operating state of the setting dial 318. At a step S203, a check is made to find if the setting dial 318 is further turned. If not, the flow comes back to the step S201 to repeat the above-stated steps. If so, the flow comes to a step S204. At the step S204, a check is made for the turning direction of the setting dial 318. In other words, a check is made to find whether the amount of exposure is to be shifted in the direction of increasing it or in the direction of decreasing it. The flow comes to a step S205 if the direction is the increasing direction or comes to a step S208 in the event of the decreasing direction.

At the step S205, a check is made to find if the AEB mode is still being set. If not, the flow comes to a step S206 to set the AEB mode by setting up an AEB mode flag provided in the RAM 309. At a next step S207, since the setting dial 318 is turned in the direction of increasing the exposure shifting amount in setting the AEB mode, the exposure shifting amount is increased by ½ step. After that, the flow comes back to the step S201 to repeat the steps subsequent thereto.

Actions or processes executed up to this part of the flow of operation are recapitulated as follows. If the setting dial 318 is turned in the direction of increasing the exposure shifting amount with the AEB switch 315 turned on when the camera is not in the AEB mode, the camera is set in the AEB mode and the exposure shifting amount is set at ½ step. Further, when the setting dial 318 is turned in the direction of increasing the exposure shifting amount by ½ step with the AEB switch 315 turned on while the camera is in the AEB mode, the exposure shifting amount can be increased by ½ step.

On the other hand, if the turning direction of the setting dial 318 is found to be in the decreasing direction at the step S204, the flow comes to the step S208. At the step S208, a check is made to find if the AEB mode is still being set. If not, the flow comes back to the step S201. By this process, no change takes place, in a case where the setting dial 318 is turned in the direction of decreasing the exposure shifting amount with the AEB switch turned on while the AEB mode is not being set. If the AEB mode is found at the step S208 to be set, the flow comes to a step S209. At the step S209, the exposure shifting amount currently set is decreased by ½ step. At a step S210, a check is made to find if the exposure shifting amount has become "0". If not, the flow comes back to the step S201. If so, the flow comes to a step S211. At the step S211, the AEB mode is canceled and the flow comes back to the step S201 to repeat the steps subsequent thereto. The AEB mode is canceled by clearing the AEB mode indicating flag of the RM 309. As described above, with the AEB switch 315 turned on while the camera is in the AEB mode, when the setting dial 318 is turned in the direction of decreasing the exposure shifting amount, the setting value of exposure shifting amount of the AEB decreases. The AEB mode is canceled when the exposure shifting amount reaches "0".

The tenth embodiment described above is arranged as follows The kind of a light source illuminating the object is judged or determined before effecting an exposure for a first frame in photographing in the AEB mode with the camera set in the AEB mode. The result of determination is stored. Information on the kind of the light source is recorded in the magnetic recording part at the first frame of photographing in the AEB mode. The information on the kind of the light source obtained and stored before the exposure of first frame is recorded in the magnetic recording part for the second and subsequent frames of photographing in the AEB mode, without making any check for the kind of the illuminating light source.

The embodiment described above is arranged to use an RGB sensor in detecting the kind of the light source illuminating the object. However, the arrangement may be changed to determined the kind of an illuminating light source by detecting the flicker of the light source.

Further, the embodiment is arranged to serially carry out the light and color measuring actions. However, these actions can be carried out in parallel with each other.

Further, the above-described arrangement of recording information on the kind of an illuminating light source in the magnetic recording part of the film may be changed to use some other storing medium such as a semiconductor memory or some optical recording means.

(Eleventh Embodiment)

An eleventh embodiment of the invention is next described as follows.

Figure 27:
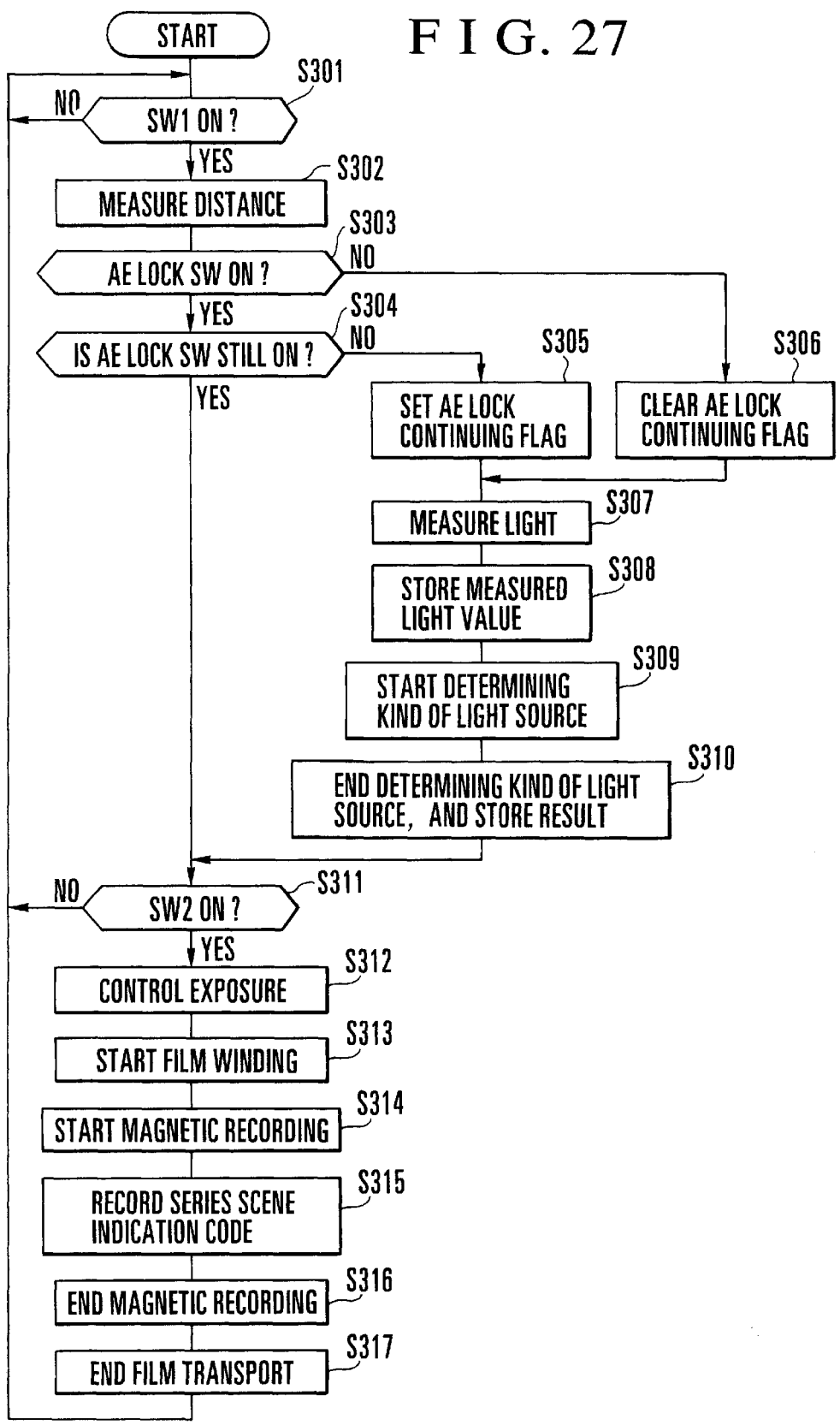
FIG. 27 is a flow chart showing processes to be executed by a camera arranged according to the invention as an eleventh embodiment thereof.

FIG. 27 is a flow chart showing processes to be performed by a camera which is arranged as the eleventh embodiment of the invention. The mechanisms and an electrical system of the camera are the same as those of the tenth embodiment described above with reference to FIGS. 21 and 23. Duplicating parts are, therefore, omitted from the following description.

The processes shown in FIG. 27 are executed by the microcomputer 303 of the camera. Referring to FIG. 27, the flow of operation of the microcomputer 303 begins when the main dial 317 of the camera 301 is turned on, i.e., when the dial 301 is unlocked. At a step S301, a check is first made to find if the release button 314 is in an on-state in its first stroke position. If so, the flow comes to a step S302 for a distance measuring action. At the step S302, the distance measuring circuit 305 is actuated to perform the distance measuring action in such a way as to detect a focus position for an object to be photographed and to bring the photo-taking lens 302 into an in-focus state. At a next step S303, a check is made for the operating state of the AE lock switch 316. If the AE lock switch 316 is found to be in an on-state, the flow comes to a step S304. At the step S304, a check is made to find if the AE lock switch 316 is still in its on-state. This step is executed to make a check for the state of an AE lock continuing flag arranged in the RAM 309 to indicate that the AE lock switch 316 continues to be pushed. If the AE lock switch 316 is found to be no longer pushed, the flow comes to a step S305. At the step S305, the AE lock continuing flag is set and stored in the RAM 309. If, at the step S303, the AE lock switch 316 is found to be in an off-state, the flow comes to a step S306 to clear the AE lock continuing flag.

After completion of the process of the step S305 or S306, the flow of operation comes to a step S307. At the step S307, the light measuring circuit 304 is caused to measure the luminance of an object to be photographed. A correct exposure value is decided on the basis of the result of the light measuring action. Then, a shutter speed or an aperture value is decided according to the photographing mode. In other words, a shutter speed is decided if the mode is the aperture priority mode or an aperture value is decided in the case of the shutter speed priory mode. At a step S308, the values decided are stored in the RAM 309. At a step S309, the kind of a light source illuminating the object is determined. At a step S310, the result of determination (information on the kind of the light source) is stored in the RAM 309.

Upon completion of the process of the step S304 or S310, the flow comes to a step S311. At the step S311, a check is made to find if the release button 314 is in an on-state in its second stroke position. If so, the flow comes to a step S312. If not, the flow comes back to the step S301 to repeat the steps described above. In other words, if the switch SW2 is in an off-state while the switch SW1 is in an on-state, the light and distance measuring actions are repeated before an exposure action and the flow waits for turning-on of the switch SW2. When the switch SW2 is turned on, the flow comes to a step S312. At the step S312, the aperture control circuit 307 is caused to stop down the aperture of the photo-taking lens 302 to a position of an aperture value decided through the steps S308 and S309 or S310. Then, the shutter control circuit 306 is actuated to carry out an exposure action by controlling and operating the shutter at the shutter speed decided through the steps S308, S309 and S310. After that, the exposure action is terminated by causing the aperture control circuit 307 to bring the aperture back to its full open position.

At a step S313, the film transporting motor 330 is caused to perform a winding action on the film 322. At steps S315 and S316, the magnetic recording circuit 332 is actuated to cause the magnetic head 331 to record data, such as a date, a shutter speed, an aperture value, the kind of light source, etc., in the magnetic recording part of the film 322. At a step S317, upon completion of the magnetic recording, the film 322 is transported as much as one photographing frame portion. When the film 322 is thus brought to a predetermined position, the film transporting motor 330 is brought to a stop to terminate a release action. The flow then comes back to the step S101 to repeat the steps described above.

In the case of the eleventh embodiment shown in FIG. 27, as described above, a process of determining the kind of a light source illuminating the object is executed when the AE lock switch is turned on before a first frame is exposed to light in taking shots for a plurality of frames in the AE lock mode. With the kind of the light source determined, information on the kind of the light source determined is stored. Then, the information on the kind of the light source is recorded in the magnetic recording part of the film at the first frame of the AE locked photographing. Then, for the consecutive frames of the AE locked photographing, the information on the kind of the light source obtained and stored before the exposure of the first frame is recorded in the magnetic recording part also for the second and subsequent frames, without newly making a check for the kind of the light source.

The eleventh embodiment described above with reference to FIG. 27 is arranged to use an RGB sensor in detecting the kind of the light source illuminating the object. However, the arrangement may be changed to determine the kind of an illuminating light source by detecting the flicker of the light source.

While the eleventh embodiment is arranged to record the information on the kind of the light source in the magnetic recording part of the film, the arrangement may be changed to record the information in some other storing medium such as a semiconductor memory or some suitable optical recording means.

What is claimed is:

1. A camera having a magnetic recording circuit arranged to record information in a magnetic recording part provided on a film, said camera comprising:

a) a recording control circuit which cause the recording circuit to record information indicating to perform printing under same condition for plural successive frames on the recording part of each of the successive plural frames, and b) a prohibition circuit which prohibits setting of a mode to operate the recording circuit when judgement is made that one frame is remaining before start of photographing.

2. A camera having a magnetic recording circuit arranged to record information in a magnetic recording part provided on a film, said camera comprising:

a) a recording control circuit which cause the recording circuit to record information indicating to perform printing under same condition for plural successive frames on the recording part of each of the successive plural frames, and b) a warning member which warns against setting of a mode to operate the recording control circuit when judgement is made that one frame is remaining before start of photographing.

* * * * *